(12) United States Patent
Myokan

(10) Patent No.: US 8,649,593 B2
(45) Date of Patent: Feb. 11, 2014

(54) IMAGE PROCESSING APPARATUS, IMAGE PROCESSING METHOD, AND PROGRAM

(75) Inventor: Yoshihiro Myokan, Kanagawa (JP)

(73) Assignee: Sony Corporation, Tokyo (JP)

( * ) Notice: Subject to any disclaimer, the term of this patent is extended or adjusted under 35 U.S.C. 154(b) by 398 days.

(21) Appl. No.: 13/115,685

(22) Filed: May 25, 2011

(65) Prior Publication Data

US 2011/0299761 A1 Dec. 8, 2011

(30) Foreign Application Priority Data

Jun. 2, 2010 (JP) ................................ P2010-127112

(51) Int. Cl.
*G06K 9/36* (2006.01)
(52) U.S. Cl.
USPC ........... 382/154; 382/106; 382/285; 382/190; 382/199
(58) Field of Classification Search
USPC ........................... 382/154, 106, 285, 190, 199
See application file for complete search history.

(56) References Cited

FOREIGN PATENT DOCUMENTS

JP 2006-250889 9/2006

OTHER PUBLICATIONS

Song et al: "High precision camera calibration in vision measurement", OLT, 2007.*
Zhang et al, "A flexible new technique for camera calibration", IEEE-PAMI, 2000.*

* cited by examiner

*Primary Examiner* — Ruiping Li
(74) *Attorney, Agent, or Firm* — Finnegan, Henderson, Farabow, Garrett & Dunner, L.L.P.

(57) ABSTRACT

An image processing apparatus includes a projective transformation unit that performs projective transformation on left and right images captured from different points of view, a projective transformation parameter generating unit that generates a projective transformation parameter used by the projective transformation unit by receiving feature point information regarding the left and right images, a stereo matching unit that performs stereo matching using left and right projective transformation images subjected to projective transformation, and a matching error minimization control unit that computes image rotation angle information regarding the left and right projective transformation images and correspondence information of an error evaluation value of the stereo matching. The matching error minimization control unit computes the image rotation angle at which the error evaluation value is minimized, and the projective transformation parameter generating unit computes the projective transformation parameter that reflects the image rotation angle at which the error evaluation value is minimized.

8 Claims, 20 Drawing Sheets

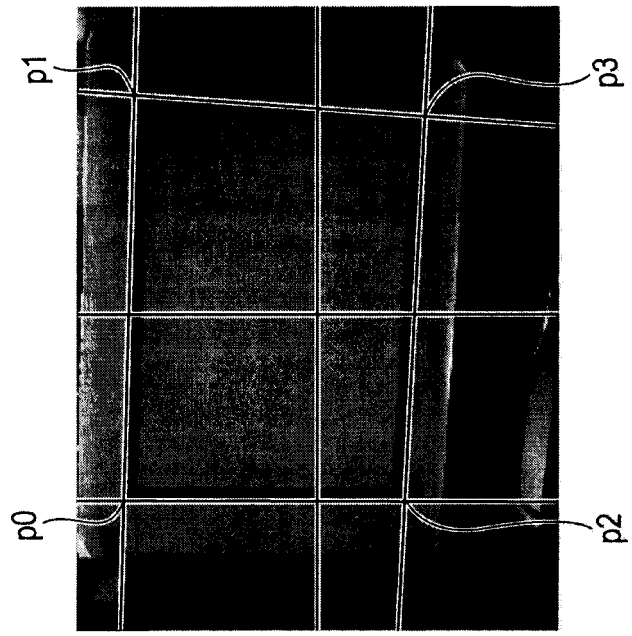
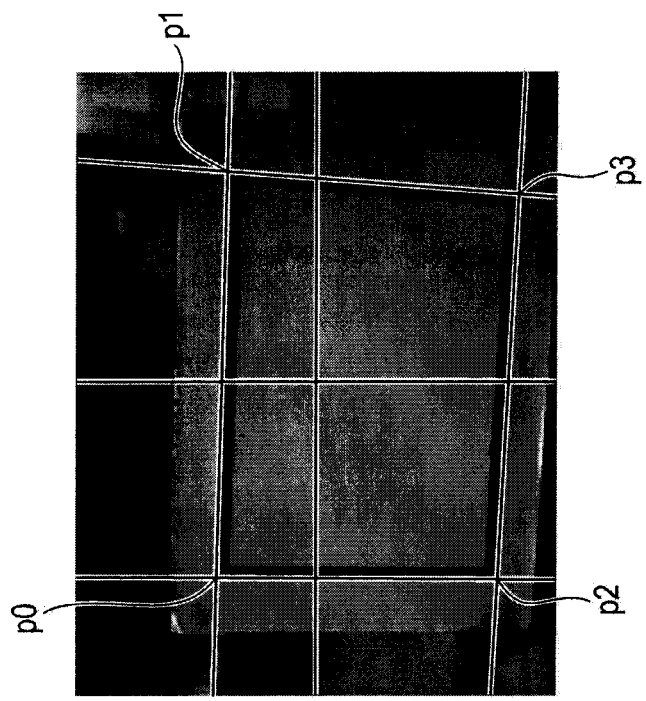

BEFORE CORRECTION (RIGHT)

BEFORE CORRECTION (LEFT)

PROJECT EACH OF LEFT AND RIGHT IMAGES TO THE SAME RECTANGLE
AFTER CORRECTION

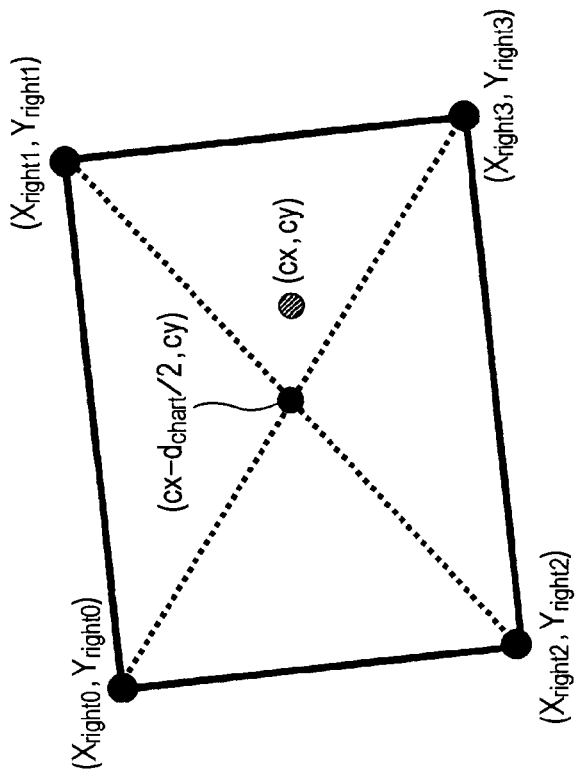
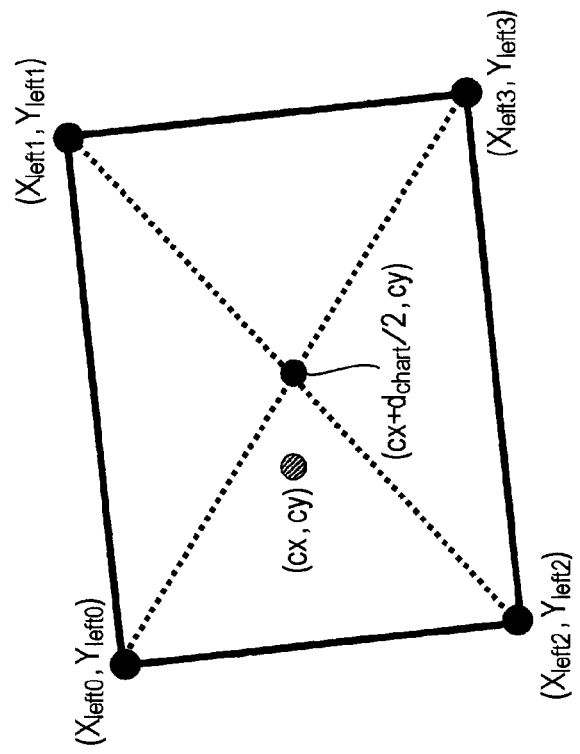

IMAGE PROCESSING APPARATUS, IMAGE PROCESSING METHOD, AND PROGRAM

BACKGROUND

The present disclosure relates to an image processing apparatus, an image processing method, and a program and, in particular, to an image processing apparatus, an image processing method, and a program that compute a subject distance on the basis of captured images obtained from different points of view or perform a correction process for computing the subject distance.

In order to compute the depth information of a subject captured by a camera, that is, a distance between the subject and the camera, techniques for analyzing the positions of the same subject in captured images using a plurality of images captured from different points of view have been developed. One of such techniques is stereo matching. Note that stereo matching is described in, for example, Yuichi Ohta and Takeo Kanade, "Stereo by Intra- and Inter-Scanline Search Using Dynamic Programming", IEEE Transactions on Pattern Analysis and Machine Intelligence, 1985.

In order to compute distance information on the basis of stereo matching, corresponding feature points are searched for from a plurality of images captured from different points of view. In general, such a search process is performed within a predetermined search area in advance. However, if corresponding feature points are not detected within the predetermined area, the process abnormally terminates. In order to reliably set a detectable search area for corresponding feature points, an image conversion process, such as projective transformation, is applied, for example. In general, an image correction process or a camera adjustment process for matching the disparity of left and right images captured from different points of view to the search area of stereo matching, such as projective transformation, is referred to as a "calibration process". Note that an existing technique using a calibration process in stereo matching is described in, for example, the following documents.

The technical document "A flexible new technique for camera calibration" at http://research.microsoft.com/~zhang describes a configuration for obtaining a projective transformation parameter used for positioning each of images by capturing the image of a chart pattern having a plurality of feature points printed thereon (the positional relationship among the feature points is predetermined) while changing the point of view and realizing calibration on the basis of the obtained parameters.

However, this technique has a problem in that it is necessary to move the chart or a camera in order to capture a plurality of images of the chart from different points of view and, therefore, it is necessary to additionally provide a step of controlling the movement.

In addition, in order to perform calibration through only one image capturing operation, Japanese Unexamined Patent Application Publication No. 2006-250889 describes a technique in which two transparent calibration charts are overlaid, the images of two or more charts having different depths are captured at the same time, and a calibration parameter is obtained.

However, in both the processes described in "Stereo by Intra- and Inter-Scanline Search Using Dynamic Programming" and Japanese Unexamined Patent Application Publication No. 2006-250889, in order to estimate a shift angle of an epipolar line used for making the search direction of stereo matching and the inclination direction of disparity the same, it is necessary to compute the shift angle on the basis of the geometric positional relationship among two or more feature points having different depths measured with sub-pel accuracy.

An example of a process for estimating the shift angle of an epipolar line is described next with reference to FIG. 1. In order to estimate the shift angle of an epipolar line, it is necessary to detect, as shown in FIG. 1, feature points a and b having different depths from a left camera image 11 and a right camera image 12 captured by a stereo camera 10 having left and right lenses, for example. Thereafter, it is necessary to compute a shift angle $\theta$ of an epipolar line 21 on the basis of the measurement of the geometric positional relationship among the feature points with sub-pel accuracy.

Through this process, the inclination angle is estimated using the geometric positional relationship among a few corresponding points in the vertical and horizontal directions. Thus, this process has a disadvantage in that it greatly relies on the sub-pel detection accuracy of a chart pattern. In order to increase the detection accuracy, it is necessary to employ a chart pattern having a complicated pattern that allows analysis of the positions of feature points on a sub-pel basis. However, if a chart pattern having such a complicated pattern is employed, it is difficult to detect corresponding feature points from the images and, therefore, mis-detection may frequently occur.

SUMMARY

Accordingly, the present disclosure provides an image processing apparatus, an image processing method, and a program that can reduce the probability of the occurrence of search error of a corresponding feature point by performing an image correction process, such as projective transformation, on images captured from different points of view using a simplified capturing configuration and reliably compute a subject distance.

According to an embodiment of the present disclosure, an image processing apparatus includes a projective transformation unit configured to perform projective transformation on a left image and a right image captured from different points of view, a projective transformation parameter generating unit configured to generate a projective transformation parameter used by the projective transformation unit by receiving feature point information regarding the left image and the right image, a stereo matching unit configured to perform stereo matching using a left projective transformation image and a right projective transformation image subjected to projective transformation performed by the projective transformation unit, and a matching error minimization control unit configured to compute image rotation angle information regarding the left projective transformation image and the right projective transformation image and correspondence information of an error evaluation value of the stereo matching. The matching error minimization control unit computes an image rotation angle at which the error evaluation value is minimized, and the projective transformation parameter generating unit computes the projective transformation parameter that reflects the image rotation angle at which the error evaluation value is minimized.

The matching error minimization control unit can sequentially update the image rotation angle information and output the image rotation angle information to the projective transformation parameter generating unit, and the projective transformation parameter generating unit can update the projective transformation parameter on the basis of the image rotation angle information input from the matching error minimization control unit. The projective transformation unit can perform projective transformation on the basis of the updated projective transformation parameter generated by the projective transformation parameter generating unit, and the stereo matching unit can perform stereo matching between the left projective transformation image and the right projective transformation image using the sequentially updated projective transformation parameter. The matching error minimization control unit can detect the image rotation angle that minimizes the error evaluation value of the stereo matching between the left projective transformation image and the right projective transformation image to which the sequentially updated projective transformation parameter is applied and output the detected image rotation angle to the projective transformation parameter generating unit. The projective transformation parameter generating unit can generate a final projective transformation parameter on the basis of the image rotation angle that minimizes the error evaluation value input from the matching error minimization control unit.

The projective transformation parameter generating unit can be configured to generate a projective transformation parameter on the basis of a plurality of feature points included in the left image and the right image, and the projective transformation parameter generating unit can receive feature point information detected by a calibration chart detecting unit configured to detect a plurality of feature points from a constituent part of a plane chart included in the left image and the right image and generates a projective transformation parameter.

The plane chart can be formed from a hollow rectangle, and the calibration chart detecting unit can detect four vertexes of the rectangle that forms the plane chart as the feature points.

The projective transformation parameter generating unit can generate the projective transformation parameter used for generating a correction image that makes the shapes of the rectangles that form the plane chart included in a left image and a right image captured from different points of view the same.

The stereo matching unit can perform stereo matching using a texture image captured inside a hollow portion of the plane chart formed from a hollow rectangle.

The image processing apparatus can perform processing by receiving a left image and a right image obtained by capturing a plane chart formed from a hollow rectangle and a textured surface located inside of the hollow portion at a distance different from the plane chart.

The image processing apparatus can receive a first left image and a first right image obtained by capturing a plane chart formed from a rectangle and a second left image and a second right image obtained by capturing a subject that does not include the plane chart, perform detection of a feature point is performed on the first left image and the first right image, and perform stereo matching between the second left image and the second right image.

According to another embodiment of the present disclosure, an image processing method for use in an image processing apparatus is provided. The method includes performing projective transformation on a left image and a right image captured from different points of view using a projective transformation unit, generating a projective transformation parameter used by the projective transformation unit by receiving feature point information regarding the left image and the right image using a projective transformation parameter generating unit, performing stereo matching using a left projective transformation image and a right projective transformation image subjected to projective transformation performed by the projective transformation unit and using a stereo matching unit, and computing image rotation angle information regarding the left projective transformation image and the right projective transformation image and correspondence information of an error evaluation value of the stereo matching using a matching error minimization control unit. The image rotation angle at which the error evaluation value is minimized is computed in computing image rotation angle information regarding the left projective transformation image and the right projective transformation image and correspondence information of an error evaluation value of the stereo matching, and the projective transformation parameter that reflects the image rotation angle at which the error evaluation value is minimized is computed in generating a projective transformation parameter.

According to still another embodiment of the present disclosure, a program for causing an image processing apparatus to perform image processing is provided. The program includes an instruction to perform projective transformation on a left image and a right image captured from different points of view using a projective transformation unit, an instruction to generate a projective transformation parameter used by the projective transformation unit by receiving feature point information regarding the left image and the right image using a projective transformation parameter generating unit, an instruction to perform stereo matching using a left projective transformation image and a right projective transformation image subjected to projective transformation performed by the projective transformation unit and using a stereo matching unit, and an instruction to compute image rotation angle information regarding the left projective transformation image and the right projective transformation image and correspondence information of an error evaluation value of the stereo matching using a matching error minimization control unit. The instruction to compute image rotation angle information regarding the left projective transformation image and the right projective transformation image and correspondence information of an error evaluation value of the stereo matching includes an instruction to compute the image rotation angle at which the error evaluation value is minimized, and the instruction to generate a projective transformation parameter includes an instruction to compute the projective transformation parameter that reflects the image rotation angle at which the error evaluation value is minimized.

The program according to the present disclosure can be provided using a computer-readable recording medium or a communication medium for, for example, an information processing apparatus and a computer system that can execute various program code. By providing such a computer-readable program, processing in accordance with the program can be realized in an image processing apparatus and a computer system.

Further features and advantages of the present disclosure will become apparent from the following detailed description of exemplary embodiments with reference to the attached drawings. In addition, as used in the present specification, the term "system" refers to a logical combination of a plurality of devices; the plurality of devices is not necessarily included in one body.

According to the configuration of the embodiment of the present disclosure, an apparatus and a method for computing a transform parameter used for reliably computing the subject distance using left and right images captured from different points of view are realized. More specifically, a projective transformation process in which projective transformation of the left and right images captured from different points of view is performed is performed. Thus, an error evaluation value of stereo matching is obtained using a left projective transformation image and a right projective transformation image subjected to projective transformation. An image rotation angle at which the error evaluation value is minimized is computed on the basis of the left projective transformation image, the right projective transformation image, and corresponding information regarding the error evaluation value. Thereafter, a projective transformation parameter corresponding to the image rotation angle is computed. Through such processing, an optimal projective transformation parameter that reduces the occurrence of an error in stereo matching can be computed.

BRIEF DESCRIPTION OF THE DRAWINGS

FIGS. 6A and 6B illustrate charts detected from left and right camera captured images;

FIGS. 13A and 13B illustrate a process performed during the projective transformation parameter generating process;

DETAILED DESCRIPTION OF EMBODIMENTS

Figure 1:
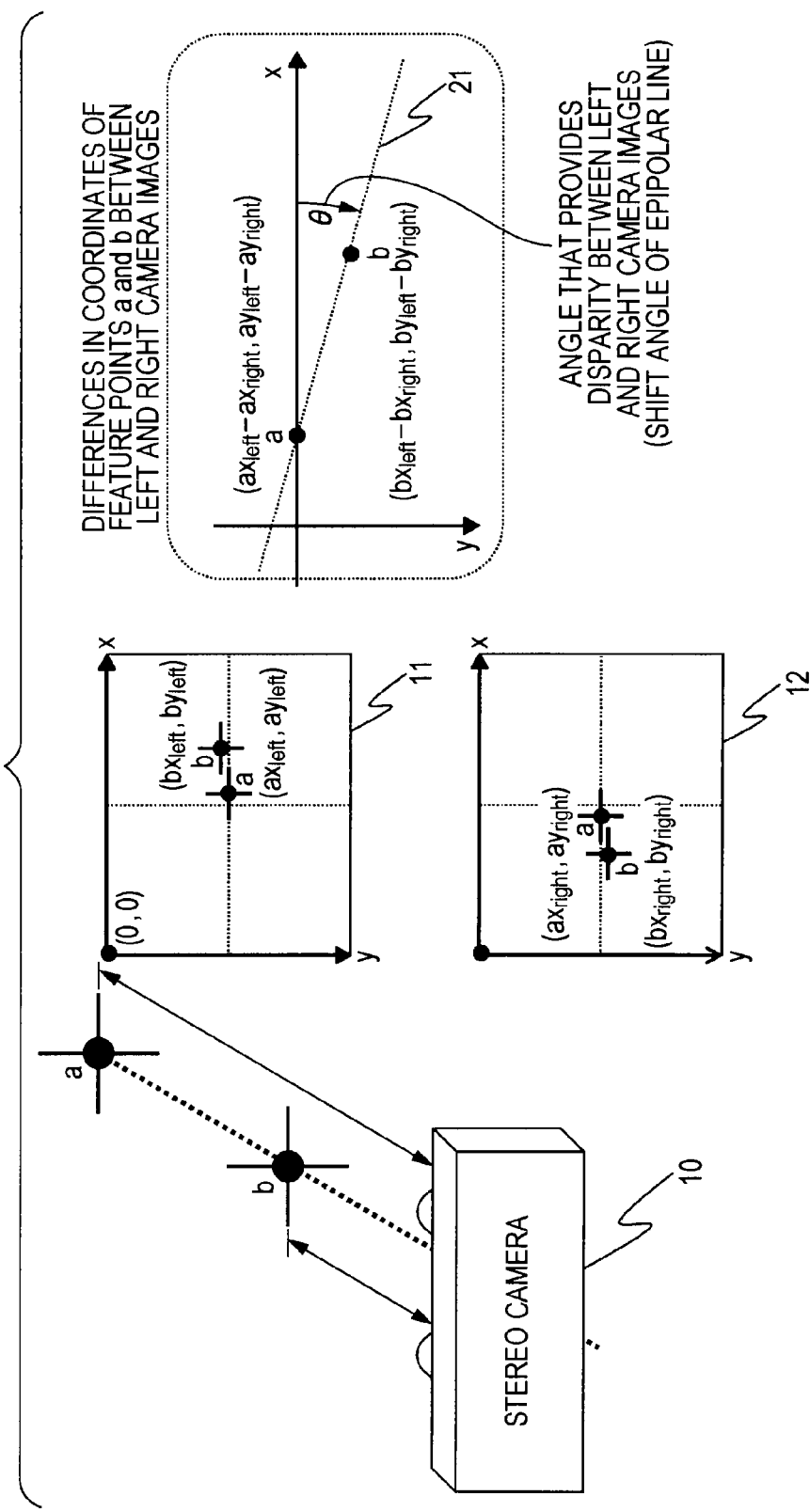
FIG. 1 illustrates a process for estimating a shift angle of an epipolar line.

An image processing apparatus, an image processing method, and a program according to an embodiment of the present disclosure are described in detail with reference to the accompanying drawings. The descriptions are made in the following order:

1. Brief Overview of Present Disclosure,
2. Image Capturing Structure of Camera,
3. Detailed Configuration of Image Processing Apparatus and Processes Performed by Image Processing Apparatus according to Present Disclosure,
4. Sequence of Processes Executed by Image Processing Apparatus according to Present Disclosure,
5. Second Sequence of Process Executed by Image Processing Apparatus according to Present Disclosure, and
6. Example of Hardware Configuration of Image Processing Apparatus.

1. Brief Overview of Present Disclosure

In the present embodiment, parameters of a process for correcting images captured from different points of view using a simplified image capturing configuration, for example, parameters of a projective transformation process of an image are computed, and a distance between a subject and a camera can be accurately computed using a projective transformation image.

In the present embodiment, images obtained by capturing a textured surface located at a depth that differs from that of a plane chart using left and right cameras of a stereo camera at the same time are processed by an image processing apparatus. By applying these captured images, distortion of a plane caused by a position/angle shift from that in the ideal state of the camera is corrected. According to the present embodiment, as the parameters applied to such correction, the image processing apparatus computes a parameter of projective transformation performed on a captured image (a calibration parameter).

In a configuration according to the present embodiment, image correction is performed using a very simple plane chart as a reference. In addition, stereo matching between the right and left images is performed using a texture image located at a depth that differs from that of the plane chart included in a captured image, and a parameter that minimizes an amount of error of stereo matching is computed. In this way, inclination of the left and right imaging plane with respect to a direction of the baseline of the camera (i.e., the epipolar line for the right and left cameras) that is unable to be corrected using only plane detection can be easily and accurately corrected.

As described above, if, in stereo matching, a corresponding point is not found, an error occurs. When the direction of the epipolar line extending between the obtained left and right images is the same as the search direction of the stereo matching process, an error is statistically minimized. That is, by adjusting the inclination angle and minimizing an error in stereo matching, the inclination angle can be corrected, that is, calibration can be realized.

Although the process is described in more detail below, the plane chart that is captured by the left and right cameras can be set so that only feature points at four vertexes of a rectangle that are located inside of the peripheral portion of the rectangle are obtained. When the center portion of the plane chart is hollow or the plane chart is transparent and if the plane chart and a textured surface having different depths are captured at the same time, calibration can be performed through only one image capturing operation. Thus, a low-cost adjustment process performed at, for example, a manufacturing time, can be realized.

2. Image Capturing Structure of Camera

The image capturing structure of a camera is described first.

Figure 2:
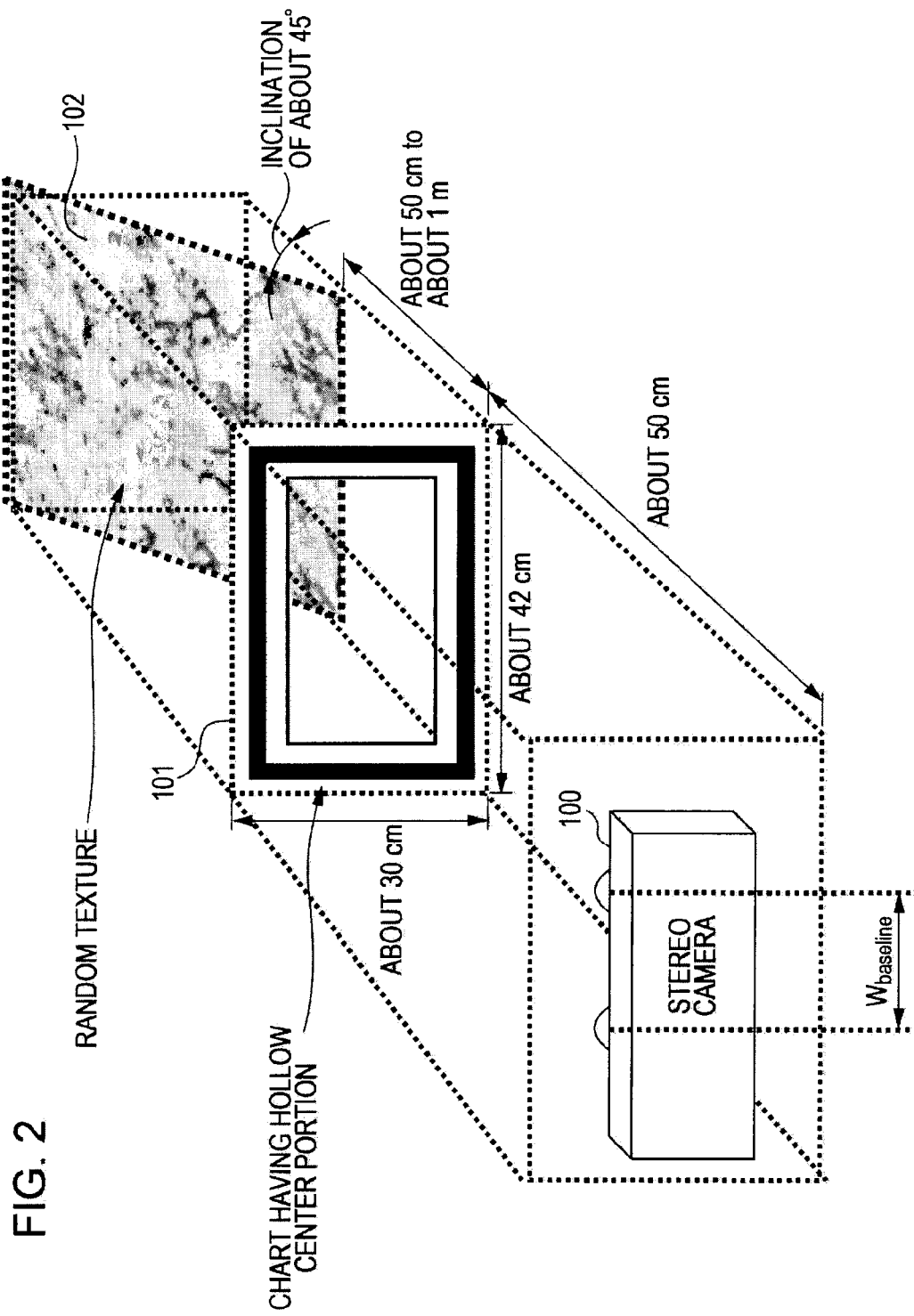
FIG. 2 illustrates an image capturing structure for performing a calibration process according to an embodiment of the present disclosure.

FIG. 2 illustrates the image capturing structure for performing a calibration process according to an embodiment of the present disclosure. In FIG. 2, an example of a layout of a stereo camera 100 that can capture two images from different points of view and a calibration chart pattern 101 and a textured surface 102 to be captured is shown.

The stereo camera 100 includes two imaging units, namely, left and right imaging units each including a lens and an image sensor module at the same distance as a predetermined baseline in the horizontal direction (e.g., 30 mm). The stereo camera 100 captures images from different points of view, that is, a left image (an L image) and a right image (an R image). The image sensor module is formed from, for example, a complementary metal-oxide semiconductor (CMOS) imaging unit that can capture images having a resolution of 320×240 at a rate of 60 frames per second.

Figure 3:
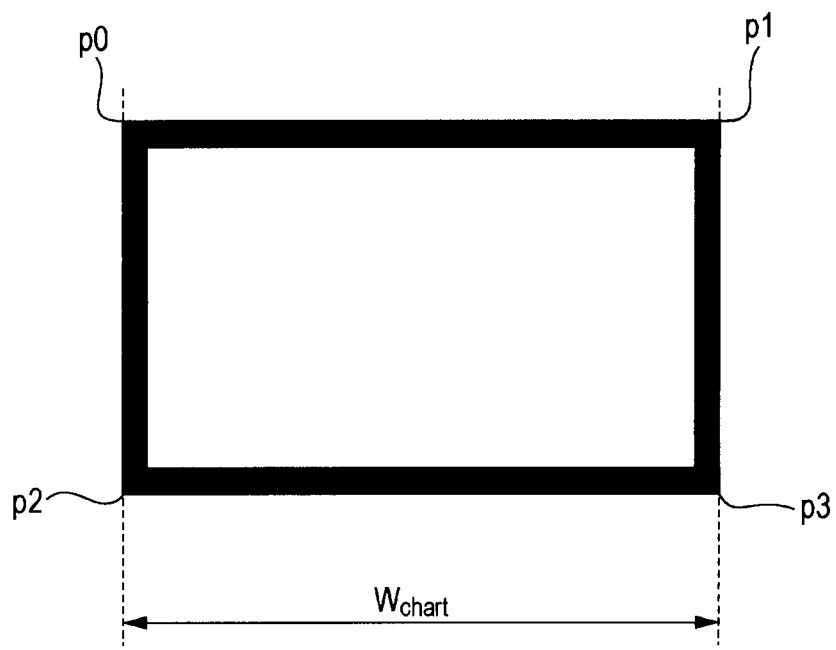
FIG. 3 illustrates an example of the structure of a calibration chart pattern.

As shown in FIG. 3, the calibration chart pattern 101 is a rectangle pattern having vertexes p0, p1, p2 and p3. It is desirable that the calibration chart pattern 101 have a hollow center portion. The calibration chart pattern 101 is placed at a distance of about 50 cm from the imaging surface of the stereo camera 100 so that the plane of the chart is as parallel to the imaging surface as possible. Note that the length of the rectangle pattern in the horizontal direction (the distance between the reference points p0 and p1 or between the reference points p2 and p3) is predetermined (e.g., 32 cm).

Note that in the image processing apparatus according to the embodiment of the present disclosure, since calibration is performed using the plane of a captured image chart as a reference, it is desirable that the plane of the calibration chart be as parallel to the imaging surface of the stereo camera as possible. Since the main purpose of calibration of the present embodiment is to correct a position/angle shift between the left and right cameras of a stereo camera, a few errors in parallelization are allowable.

A textured surface 102 has a random pattern and is disposed further away toward the back side from the camera than the calibration chart pattern 101. At that time, it is desirable that the depth from the imaging surface of the stereo camera 100 be varied in the vertical direction. For example, the textured surface 102 is inclined, as shown in FIG. 3. Note that the textured surface may not be flat, but may have irregularities.

3. Detailed Configuration of Image Processing Apparatus and Processes Performed by Image Processing Apparatus According to Present Disclosure The configuration of an image processing apparatus that performs calibration (computation of a projective transformation parameter) using left and right images captured by a stereo camera and the processes performed by the image processing apparatus according to an embodiment of the present disclosure are described below.

Figure 4:
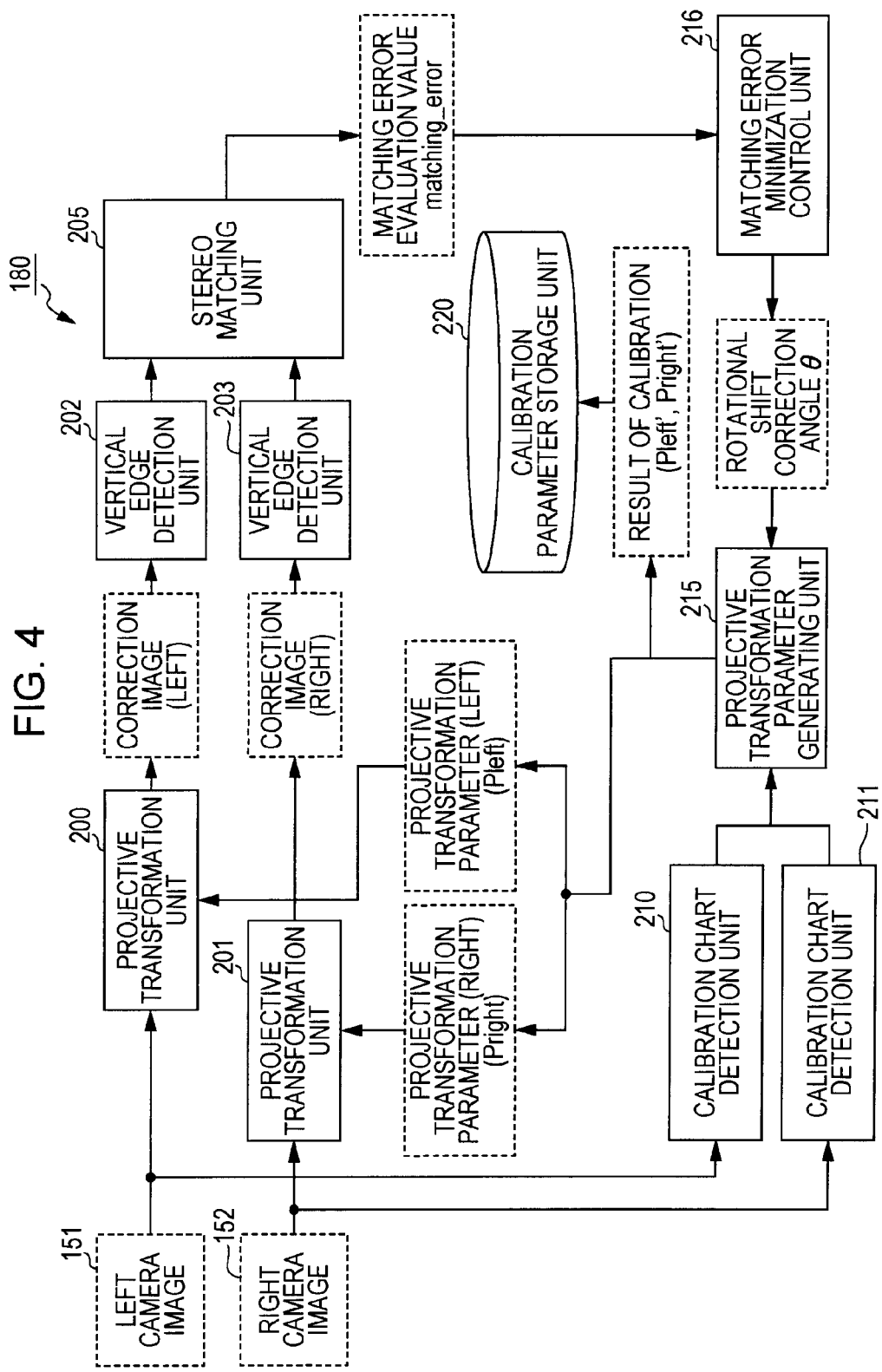
FIG. 4 illustrates an example of the configuration of an image processing apparatus according to an embodiment of the present disclosure.

FIG. 4 illustrates an example of the configuration of an image processing apparatus 180 according to an embodiment of the present disclosure.

The image processing apparatus 180 uses an image captured by the stereo camera 100 from the left point of view in the image capturing structure shown in FIG. 2 as a left camera image 151 shown in FIG. 4 and uses an image captured by the stereo camera 100 from the right point of view in the image capturing structure shown in FIG. 2 as a right camera image 152 shown in FIG. 4. The image processing apparatus 180 receives such images and performs processing.

The image processing apparatus 180 includes projective transformation units 200 and 201, vertical edge detection units 202 and 203, a stereo matching unit 205, calibration chart detection units 210 and 211, a projective transformation parameter generating unit 215, a matching error minimization control unit 216, and a calibration parameter storage unit 220.

The processes performed by the units are described below.
<Process for Extracting Chart Feature Points (p0 to p3) (STEP2 of Flow Shown in FIG. 18)>

The calibration chart detection units 210 and 211 receive the left camera image 151 and the right camera image 152 and detect, from the images, the calibration chart pattern 101 shown in FIG. 2, that is, a rectangle chart through image processing described below.

Figure 18:
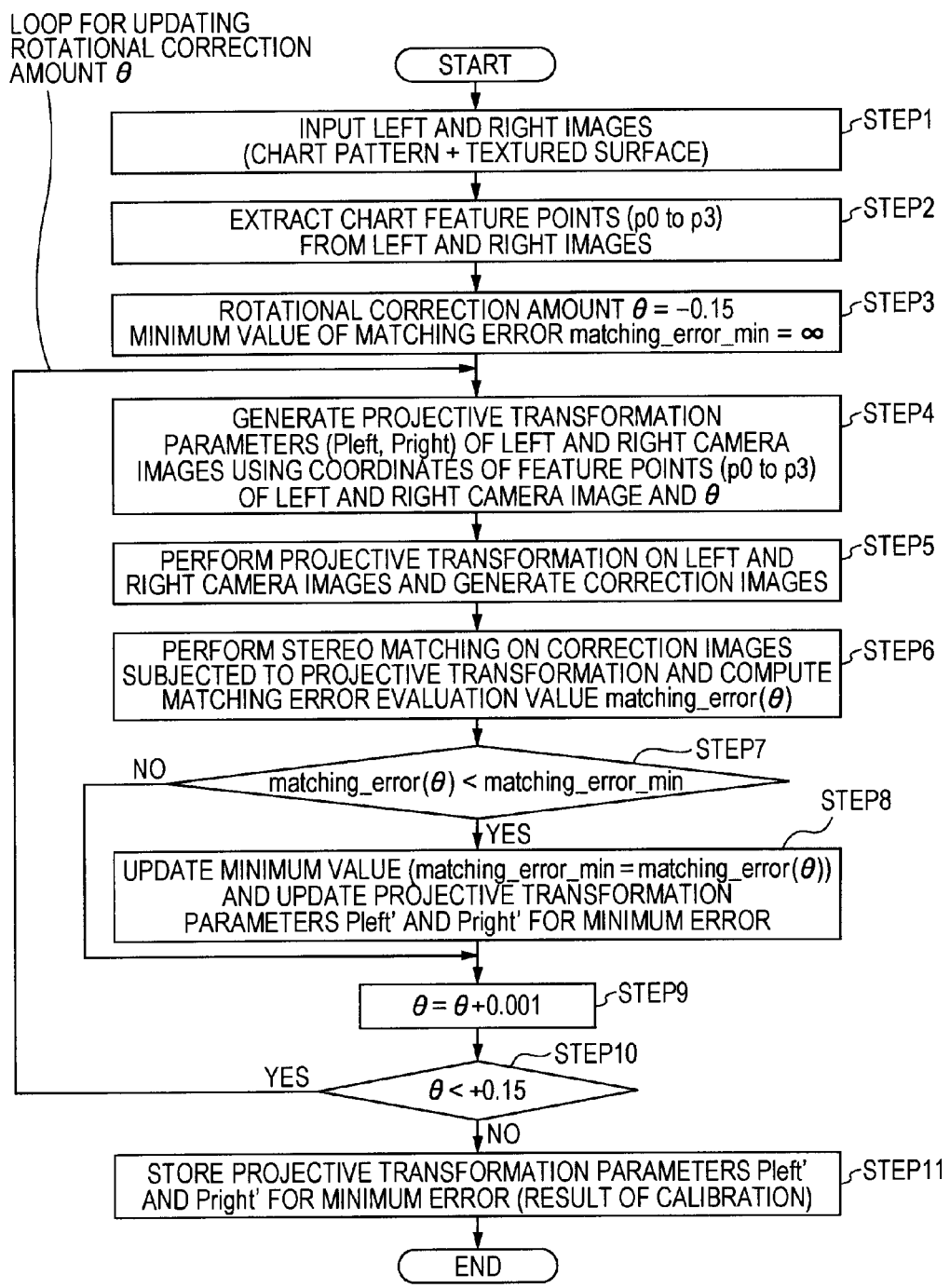
FIG. 18 is a flowchart illustrating a processing sequence performed by the image processing apparatus according to an embodiment of the present disclosure.

Note that this processing corresponds to the process performed in step 2 (STEP2) in the flowchart shown in FIG. 18.

The calibration chart detection units 210 and 211 detect an edge which represents an outline of a rectangle chart by, for example, applying an edge detection filter. For example, the calibration chart detection units 210 and 211 detect an edge in the horizontal direction and an edge in the vertical direction using a PREWITT filter. More specifically, let g(x, y) denote the luminance value of an input image and f(x, y) denote the luminance value of an output image. Then, computation can be performed using the following equations (1) to (3):

$$f(x, y) = \sum_{j=0,1,2} \sum_{i=0,1,2} \{g(x+i-1, y+j-1) \cdot h(i, j)\} \quad (1)$$

$$\text{Vertical edge: } h = \begin{pmatrix} -1 & 0 & +1 \\ -1 & 0 & +1 \\ -1 & 0 & +1 \end{pmatrix} \quad (2)$$

$$\text{Horizontal edge: } h = \begin{pmatrix} -1 & -1 & -1 \\ 0 & 0 & 0 \\ +1 & +1 & +1 \end{pmatrix} \quad (3)$$

Subsequently, a portion in which the detected edge is continuous is obtained. Thus, the series of coordinates of the edges corresponding to four lines, namely, upper, lower, left, and right lines, are extracted. By using these series of coordinates and a least square method, linear equations representing the four lines are obtained.

The upper and lower lines can be approximated by a linear equation, such as y=ax+b, and the left and right lines can be approximated by a linear equation, such as x=cx+d. The coordinates of the left and right chart reference points p0 to p3 correspond to the intersecting points of the upper and lower lines and the left and right lines and, therefore, the chart reference points p0 to p3 can be obtained by simultaneously solving the equations representing the lines.

As an example, the result of detecting charts from the left and right captured camera images is shown in FIGS. 5A and 5B and FIGS. 6A and 6B.

Figure 5B:
FIGS. 5A and 5B illustrate charts detected from left and right camera captured images.
Figure 5A:

FIGS. 5A and 5B illustrate the left camera image and right camera image captured from different points of view, respectively.

Each of the camera images includes a rectangle formed by the lines. This rectangle represents the image obtained by capturing the calibration chart pattern 101 illustrated in FIGS. 2 and 3.

An edge detection process is performed on the captured image in the horizontal direction and the vertical direction using, for example, the above-described PREWITT filter. More specifically, the luminance value of the input image is defined as g(x, y), and the luminance value of the output image is defined as f(x, y). Thereafter, computation indicated by the above-described equations (1) to (3) is performed. In this way, the edge detection process is performed.

Through the edge detection process, the upper and lower lines are obtained in the form of a linear equation, such as y=ax+b, and the two left and right lines are obtained in the form of a linear equation, such as x=cx+d. The coordinates of the left and right chart reference points p0 to p3 correspond to the intersecting points of the upper and lower lines and the two left and right lines and, therefore, the chart reference points p0 to p3 can be obtained by simultaneously solving the equations representing the lines. The computation result is shown in FIG. 6.

<Generation of Projective Transformation Parameter (a to h) (STEP4 of Flow Shown in FIG. 18)>

Figure 7B:
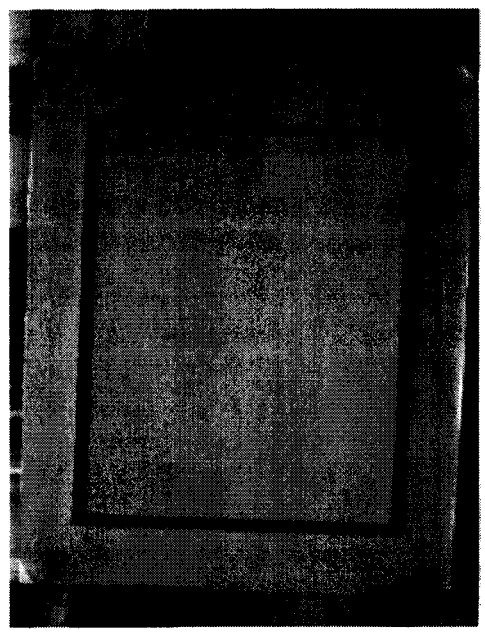
FIGS. 7A and 7B illustrate an example of desired left and right correction images.
Figure 7A:
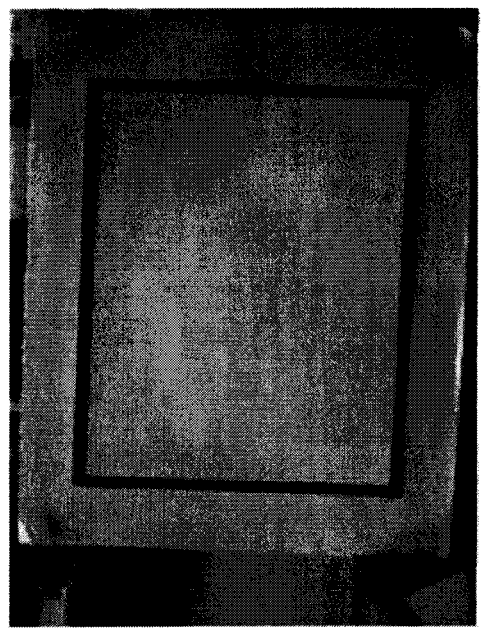

The projective transformation parameter generating unit 215 computes a projective transformation parameter used for transforming the left and right camera images to desired left and right corrected images in the projective transformation units 200 and 201 using the four coordinates of the chart feature points (p0, p1, p2, and p3) detected from the left and right camera images in the calibration chart detection units 210 and 211 and a rotational shift correction amount θ (described below) output from the matching error minimization control unit 216. The processing is described in more detail below. Note that the term "desired left and right corrected images" refers to images including the same calibration charts displayed in the left corrected image and the right corrected image, as illustrated in FIGS. 7A and 7B.

Note that this processing corresponds to the processing performed in step 4 (STEP4) in the flowchart shown in FIG. 18.

A projective transformation parameter for obtaining such corrected images, that is, a projective transformation parameter for transforming the captured left and right images to the desired left and right corrected images through projective transformation is computed.

First, in order to project quadrangles each formed by the lines connecting four feature points (p0, p1, p2, p3) obtained from the left and right images to a rectangle having the same shape, the projective transformation parameter generating unit 215 computes the lengths of the sides (w, h) of a reference rectangle in the horizontal and vertical directions and an inclination angle φ after correction.

Figure 8B:
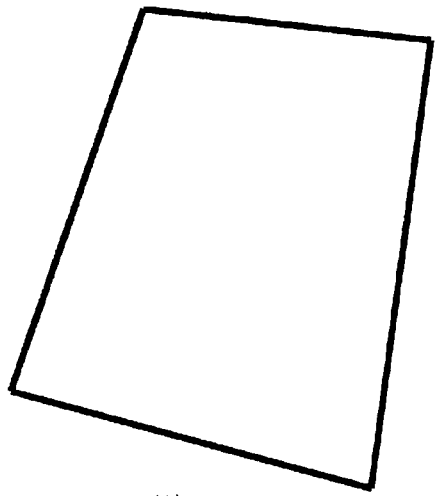
FIGS. 8A to 8C illustrate an example of a process for setting a reference rectangle through image correction performed in a projective transformation parameter generating process.
Figure 8A:
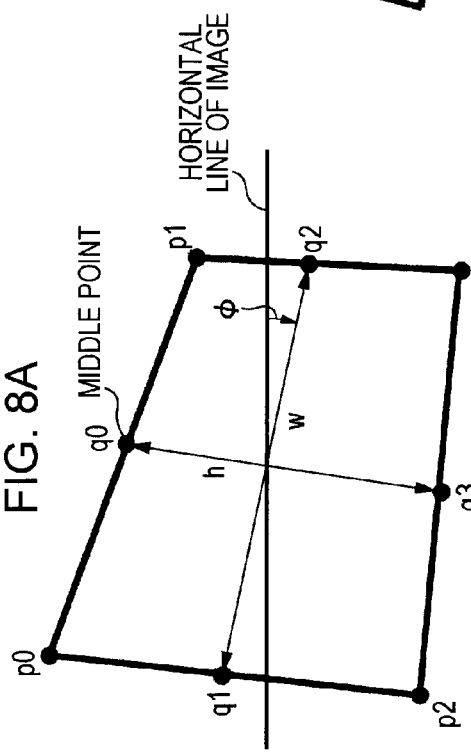

As shown in FIG. 8A, the projective transformation parameter generating unit 215 computes a middle point q0 between the chart reference points p0 and p1, a middle point q1 between the chart reference points p2 and p3, a middle point q2 between the chart reference points p0 and p2, and a middle point q3 between the chart reference points p1 and p3 from one of the left and right camera images (the left camera image in this example).

In addition, the projective transformation parameter generating unit 215 defines the length of a line extending between the middle points q1 and q2 as w and defines the length of a line extending between the middle points q0 and q3 as h. Furthermore, the projective transformation parameter generating unit 215 defines the inclination of the line extending between the middle points q1 and q2 with respect to the camera image horizontal line as φ (in this example, the clockwise direction is considered as positive).

Figure 8C:
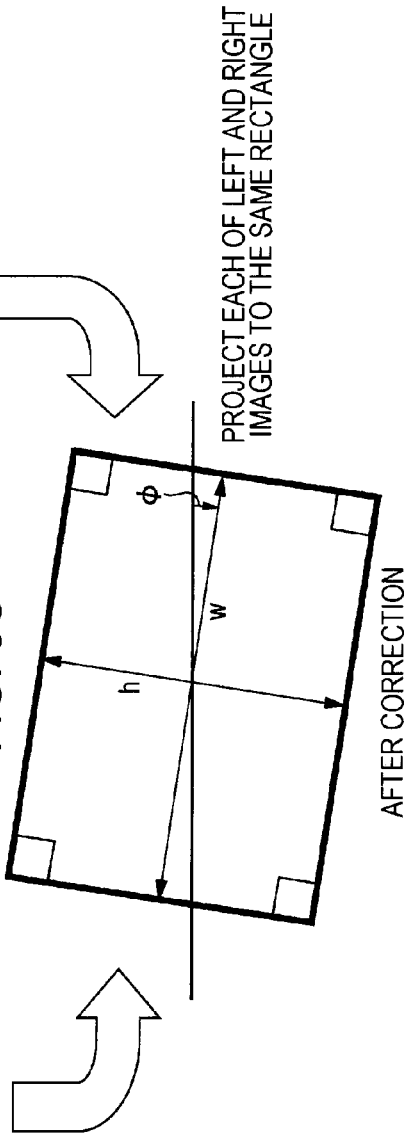

The rectangle shown in FIG. 8C has sides having a length of h and sides having a length of w. This rectangle is referred to as a "reference rectangle".

Figure 9:
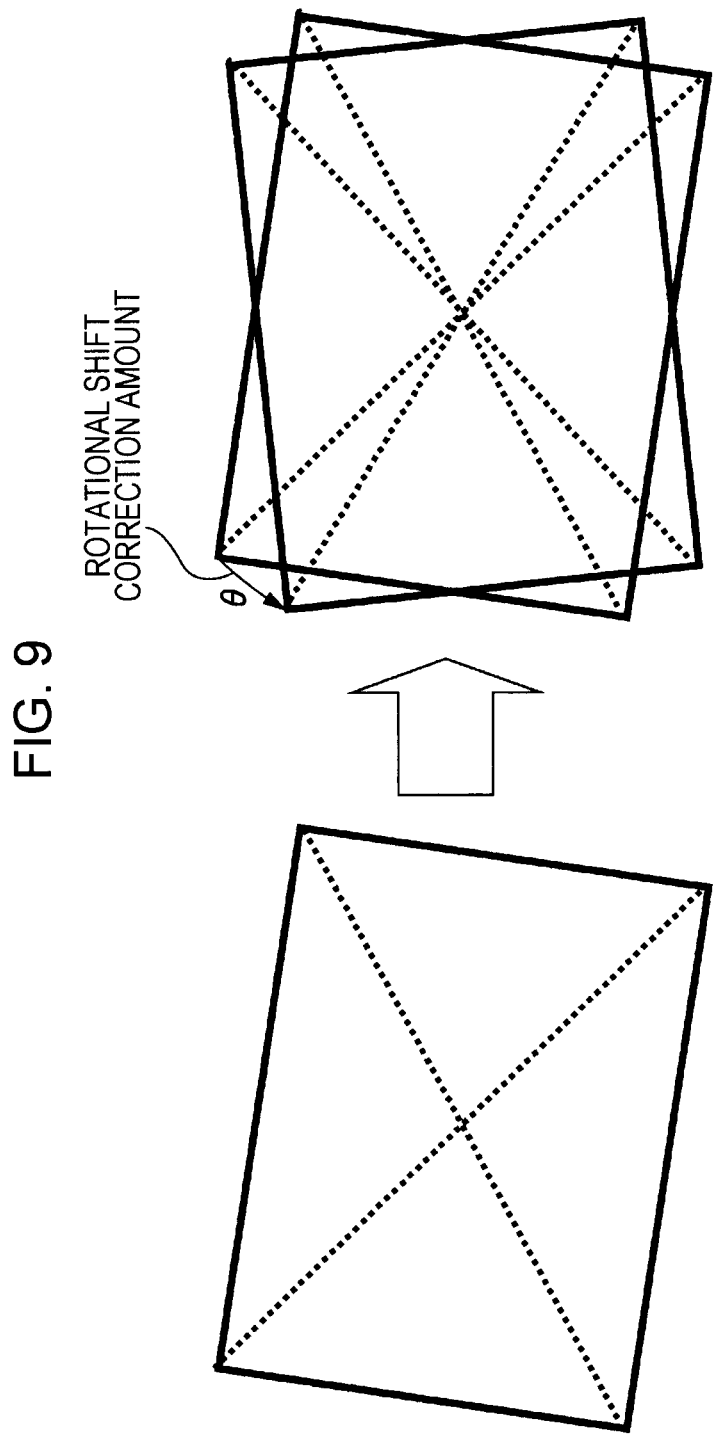
FIG. 9 illustrates a rotation process performed on the basis of a rotational correction amount output from a matching error minimization control unit.
Figure 10:
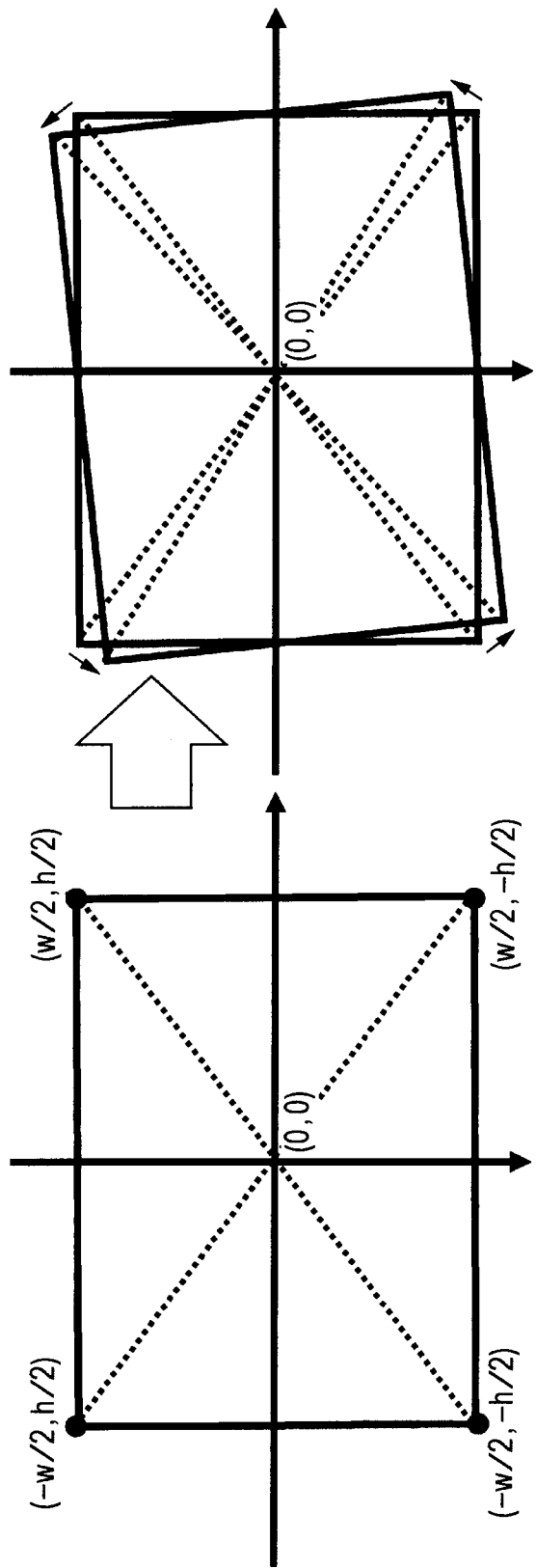
FIG. 10 illustrates a process performed during the projective transformation parameter generating process.

In addition, as shown in FIG. 9, the projective transformation parameter generating unit 215 rotates the reference rectangle (see FIG. 8C) by a rotation correction amount θ output from the matching error minimization control unit 216 (for example, by an initial value θ=−0.15 [rad]). As shown in FIG. 10, this can be done by placing the centroid of a rectangle having vertexes (−w/2, h/2), (w/2, h/2), (−w/2, −h/2), and (w/2, −h/2) at the origin (0, 0) and rotating the rectangle by an angle (φ+θ).

Figure 11:
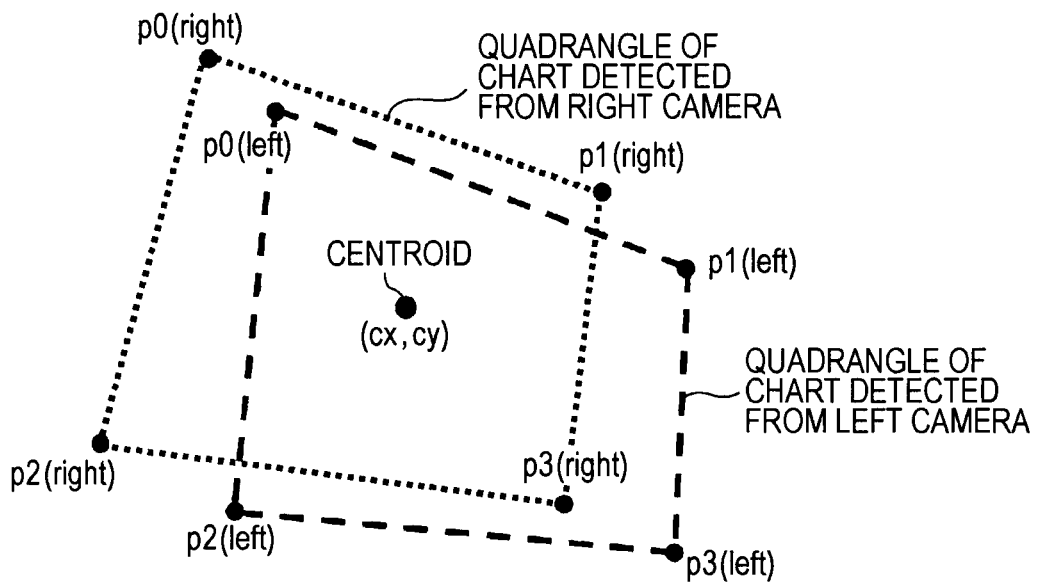
FIG. 11 illustrates a process performed during the projective transformation parameter generating process.

Subsequently, as shown in FIG. 11, the centroid of a quadrangle formed by the reference points p0 to p3 of a chart is detected from the image captured by the left camera. In addition, the centroid of a quadrangle formed by the reference points p0 to p3 of a chart is detected from the image captured by the right camera. Let (cx, cy) denote the middle point between the centroids. Then, the above-described reference rectangle (in which the centroid thereof is the point of origin) is translated so that the point (cx, cy) becomes the centroid thereof (refer to FIG. 12).

Since such a process corresponds to the process in which the reference rectangle is rotated by an angle (φ+θ) using affine transform and, thereafter, is translated by (cx, cy), the coordinates (X, Y) of the final reference rectangle is expressed as follows:

$$\begin{pmatrix} X \\ Y \end{pmatrix} = \begin{pmatrix} x \\ y \end{pmatrix} \begin{pmatrix} \cos(\phi+\theta) & -\sin(\phi+\theta) \\ \sin(\phi+\theta) & \cos(\phi+\theta) \end{pmatrix} + \begin{pmatrix} cx \\ cy \end{pmatrix} \quad (4)$$

Figure 12:
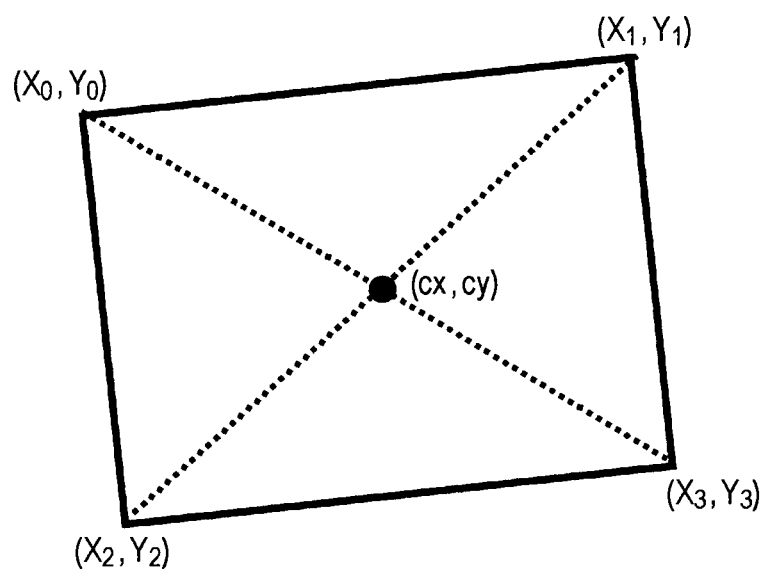
FIG. 12 illustrates a process performed during the projective transformation parameter generating process.

In equation (4), by substituting the coordinates of the vertexes (−w/2, h/2), (w/2, h/2), (−w/2, −h/2), and (w/2, −h/2) of the reference rectangle having the centroid serving as the point of origin into (x, y), absolute coordinates $(X_0, Y_0)$, $(X_1, Y_1)$, $(X_2, Y_2)$, and $(X_3, Y_3)$ can be obtained, as shown in FIG. 12.

Finally, as shown in FIGS. 13A and 13B, the coordinates of vertexes $(X_{left0}, Y_{left0})$ to $(X_{left3}, Y_{left3})$ of the reference rectangle of a left correction image (see FIG. 13A) and the coordinates of vertexes $(X_{right0}, Y_{right0})$ to $(X_{right3}, Y_{right3})$ of the reference rectangle of a right correction image (see FIG. 13B) are obtained.

These values can be obtained by translating the reference rectangle in the horizontal direction so that the disparity of an object at infinity disappears in each of the left and right correction images (the coordinates match in the horizontal direction). That is, the reference rectangle can be translated in the horizontal direction by a left-right disparity $d_{chart}$ corresponding to the distance between the stereo camera and the chart pattern. The detailed procedure is described below.

If a length $W_{chart}$ of the rectangle pattern of the chart in the horizontal direction in a real space (a distance between p0 and p1 or between p2 and p3) and the length of the baseline $W_{baseline}$ between the left and right cameras are known, the disparity $d_{chart}$ can be computed using the length w of the rectangle pattern obtained from the left and right camera images as follows:

$$d_{chart} = w \frac{W_{baseline}}{W_{chart}} \quad (5)$$

Accordingly, if the left-right disparity is taken into account, the coordinates (($X_{left0}, Y_{left0}$) to ($X_{left3}, Y_{left3}$) and $X_{right0}, Y_{right0}$) to ($X_{right3}, Y_{right3}$) of the reference rectangles can be expressed by translating the coordinates (X, Y) obtained above by the disparity obtained above so that the left and right images are equal in terms of shape as follows:

$$\begin{pmatrix} X_{left} \\ Y_{left} \end{pmatrix} = \begin{pmatrix} X \\ Y \end{pmatrix} + \begin{pmatrix} \frac{d_{chart}}{2} \\ 0 \end{pmatrix} \quad (6)$$

$$\begin{pmatrix} X_{right} \\ Y_{right} \end{pmatrix} = \begin{pmatrix} X \\ Y \end{pmatrix} - \begin{pmatrix} \frac{d_{chart}}{2} \\ 0 \end{pmatrix} \quad (7)$$

Note that $(X_{left}, Y_{left})$ represents $(X_{left0}, Y_{left0})$ to $(X_{left3}, Y_{left3})$ and $(X_{right}, Y_{right})$ represents $(X_{right0}, Y_{right0})$ to $(X_{right3}, Y_{right3})$.

By arranging the above-described equations, the coordinates $(X_{left}, Y_{left})$ of the reference rectangle of the left correction image can be expressed as follows:

$$\begin{pmatrix} X_{left} \\ Y_{left} \end{pmatrix} = \begin{pmatrix} x \\ y \end{pmatrix} \begin{pmatrix} \cos(\theta+\phi) & -\sin(\theta+\phi) \\ \sin(\theta+\phi) & \cos(\theta+\phi) \end{pmatrix} + \begin{pmatrix} cx + \frac{d_{chart}}{2} \\ cy \end{pmatrix} \quad (8)$$

In addition, the coordinates $(X_{right}, Y_{right})$ of the reference rectangle of the right correction image can be expressed as follows:

$$\begin{pmatrix} X_{right} \\ Y_{right} \end{pmatrix} = \begin{pmatrix} x \\ y \end{pmatrix} \begin{pmatrix} \cos(\phi+\theta) & -\sin(\phi+\theta) \\ \sin(\phi+\theta) & \cos(\phi+\theta) \end{pmatrix} + \begin{pmatrix} cx - \frac{d_{chart}}{2} \\ cy \end{pmatrix} \quad (9)$$

Accordingly, by substituting four coordinates $(-w/2, h/2)$, $(w/2, h/2)$, $(-w/2, -h/2)$, and $(w/2, -h/2)$ of the vertexes of the reference rectangle having the centroid serving as the point of origin into $(x, y)$, the four coordinates of the vertexes of the reference rectangle of each of the left and right correction images can be computed ($(X_{left}, Y_{left})$ for the left correction image and $(X_{right}, Y_{right})$ for the right correction image) can be computed.

The relationship between the coordinates $(X_{left}, Y_{left})$ and $(X_{right}, Y_{right})$ of the correction images computed in the above-described manner and the feature point detection coordinates $(X_{left}, Y_{left})$ and $(X_{right}, Y_{right})$ obtained from the left and right camera images can be expressed using projective transformation shown in FIG. 14 as follows:

$$x = \frac{aX + bY + c}{gX + hY + 1} \quad (10)$$

$$y = \frac{dX + eY + f}{gX + hY + 1} \quad (11)$$

where $(X, Y)$ represents the coordinates of the correction image after projective transformation is performed, $(x, y)$ represents the coordinates of a camera image before projective transformation is performed, and variables a, b, c, d, e, f, g, and h represent the projective transformation parameters.

Let $(X_n, Y_n)$ and $(X_n, Y_n)$ denote the coordinates $(x, y)$ before projective transformation is performed and the coordinates $(X, Y)$ after projective transformation is performed, respectively (n=0 to 3), and a projective transformation parameter P is expressed as: P=(a, b, c, d, e, f, g, h). Then, the above-described equations (10) and (11) can be transformed to the following equation (12):

$$\begin{pmatrix} X_1 & y_1 & 1 & 0 & 0 & 0 & -x_1X_1 & -x_1X_1 \\ 0 & 0 & 0 & X_1 & y_1 & 1 & -x_1X_1 & -x_1X_1 \\ X_2 & y_2 & 1 & 0 & 0 & 0 & -x_2X_2 & -x_2X_2 \\ 0 & 0 & 0 & X_2 & y_2 & 1 & -x_2X_2 & -x_2X_2 \\ X_3 & y_3 & 1 & 0 & 0 & 0 & -x_3X_3 & -x_3X_3 \\ 0 & 0 & 0 & X_3 & y_3 & 1 & -x_3X_3 & -x_3X_3 \\ X_4 & y_4 & 1 & 0 & 0 & 0 & -x_4X_4 & -x_4X_4 \\ 0 & 0 & 0 & X_4 & y_4 & 1 & -x_4X_4 & -x_4X_4 \end{pmatrix} P^T = \begin{pmatrix} 1 \\ 1 \\ 1 \\ 1 \\ 1 \\ 1 \\ 1 \\ 1 \end{pmatrix} \quad (12)$$

By substituting the coordinates of the four chart reference points p0, p1, p2 and p3 in the left and right camera images into $(x_n, y_n)$ of the above-described equation (12) and substituting the coordinates $(X_{left}, Y_{left})$ and $(X_{right}, Y_{right})$ of the vertexes of the reference rectangle of the left and right correction images obtained using equations (8) and (9) into $(X_n, Y_n)$, the projective transformation parameters P for the left image and the right image can be obtained as the solution of the simultaneous equation. Hereinafter, let Pleft and Pright denote the projective transformation parameters (P) for the left image and the right image, respectively.

<Projective Transformation Process Performed on Left and Right Images (STEP5 of Flow Shown in FIG. 18)>

Figure 14:
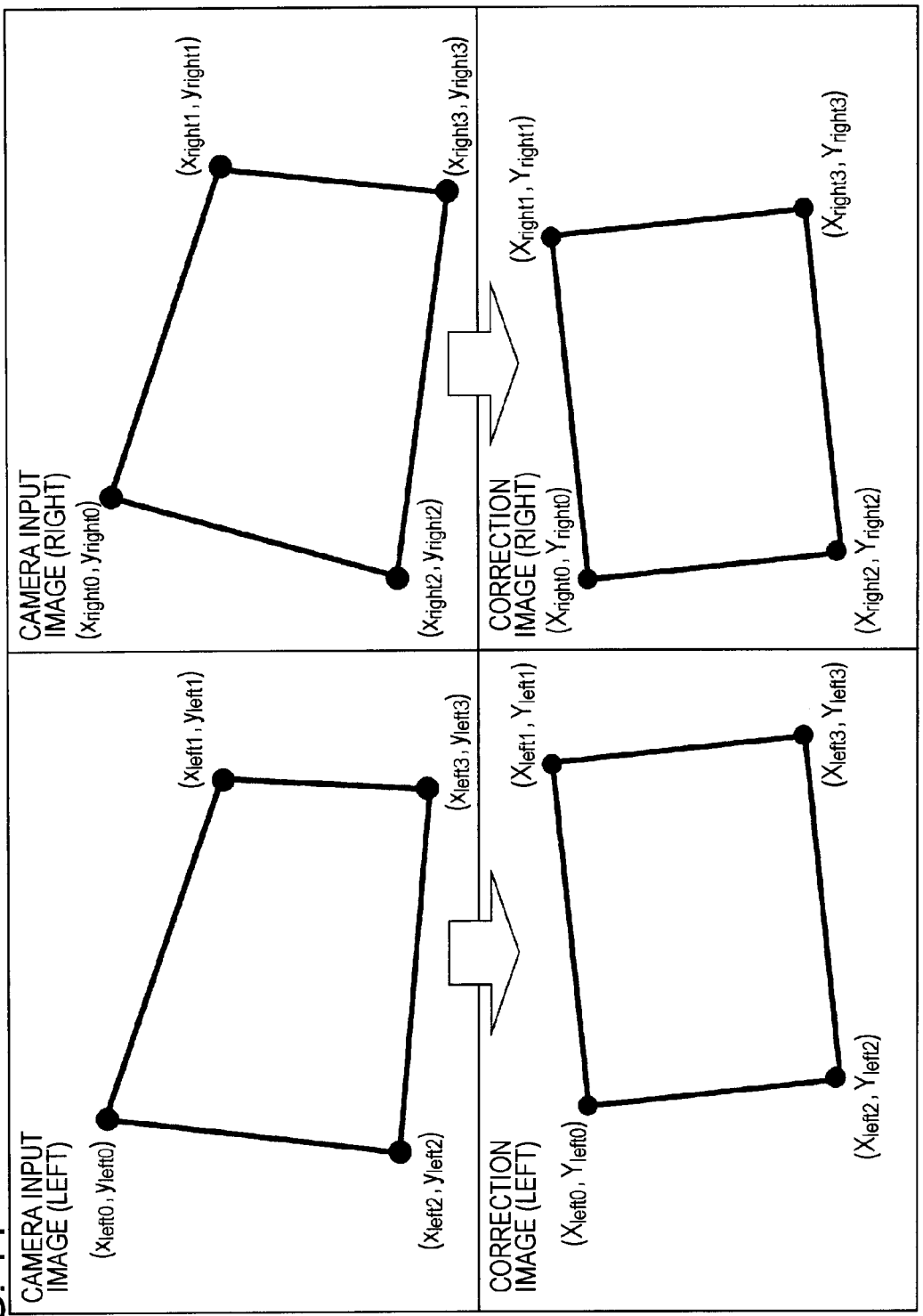
FIG. 14 illustrates a process performed during the projective transformation parameter generating process.

As shown in FIG. 14, the projective transformation units 200 and 201 perform a projective transformation process on the input left and right camera images using the projective transformation parameters Pleft and Pright obtained by the projective transformation parameter generating unit 215 for the left and right images.

Note that this process corresponds to step 5 (STEP5) of the flowchart shown in FIG. 18.

More specifically, the coordinates (x, y) of the input camera image corresponding to the coordinates (X, Y) of the correction image are obtained using the above-described equations (10) and (11). In this way, each of pixel values of the correction image is mapped to the input camera image. Note that in mapping, in order to reduce aliasing, pixel interpolation is performed using, for example, a bi-linear method.

<Stereo Matching Performed on Projective Transformation Image (STEP6 of Flow Shown in FIG. 18)>

The vertical edge detection units 202 and 203 remove a DC component of the captured image and extract only a vertical edge component that is necessary for search for left and right corresponding points in stereo matching.

Note that this process corresponds to step 6 (STEP6) of the flowchart shown in FIG. 18.

Figure 15:
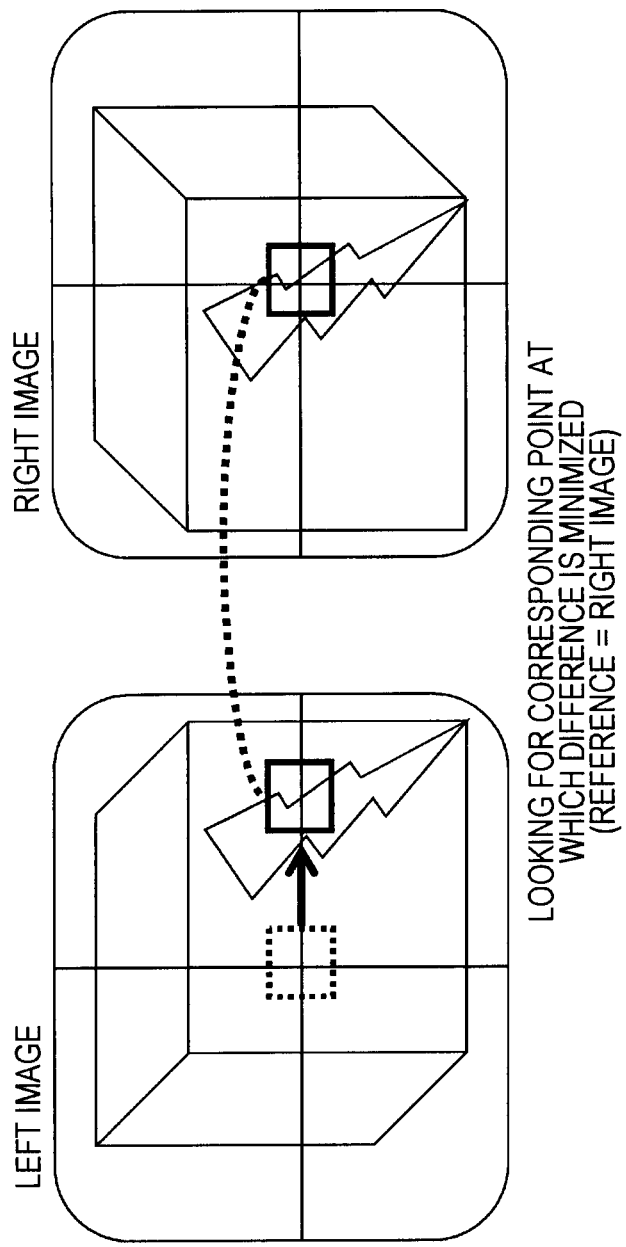
FIG. 15 illustrates a stereo matching process.

For example, as shown in FIG. 15, the search for left and right corresponding points in stereo matching corresponds to a process for detecting the images of the same subject from the left image and the right image. In this process, only a vertical edge component that is necessary for a search operation for left and right corresponding points in stereo matching is extracted. Accordingly, even when the offset of the luminance value between the left and right camera modules varies, the effect can be eliminated. More specifically, for example, let g(x, y) be the luminance value of the input image and f(x, y) be the luminance value of the output image. Then, computation can be performed using the above-described equations (1) and (2).

The stereo matching unit 205 searches for the corresponding points of the vertical edge in the left and right images subjected to projective transformation. Thus, the stereo matching unit 205 computes a matching error evaluation value. The size of an image area for which the matching process is performed can be set to a variety of values. In this example, a process using stereo matching based on a block matching method is described. In the block matching method, a difference pixel value (a disparity) of the coordinates of a point of the left image corresponding to a 4×4 pixel block located at given coordinates of the right image is computed.

When the process is performed on a per 4×4 pixel block basis, the range of each of x and y of the output coordinates (x, y) is reduced to ¼ of the input image in the vertical direction and the horizontal direction. Let left(x, y) and right(x, y) be the left edge image and the right edge image output from the vertical edge detection units 202 and 203, respectively. In addition, let "disparity" be the disparity between the left and right images. Then, the absolute sum of differences block_abs_sum(x, y, disparity) of a 4×4 pixel block between the left and right images at the output coordinates (x, y) is expressed as follows:

$$\text{block\_abs\_sum}(x, y, \text{disparity}) = \sum_{j=0,1,2,3} \sum_{i=0,1,2,3} \text{abs} \quad (13)$$
$$\{\text{left}(4x + i + \text{disparity}, 4y + j) - \text{right}(4x + i, 4y + j)\}$$

The value of disparity that minimizes the absolute sum of differences block_abs_sum(x, y, disparity) of a 4×4 pixel block in equation (13) is obtained by continuously varying the disparity [disparity] within a predetermined range (e.g., 0 to 63 pixels) on a per pixel basis. The obtained value of disparity is defined as disparity [disparity(x, y)].

As indicated by the following equation (14), an integration value of the minimum absolute sum of differences block_abs_sum(x, y, disparity) obtained through the above-described block matching process for the number of output pixels tends to statistically increase with an increase in the number of blocks in which the corresponding points of the left and right stereo images are not correctly found. Accordingly, the integration value is defined as a stereo matching error evaluation value matching_error.

$$\text{matching\_error} = \sum_x \sum_y (\text{block\_abs\_sum}(x, y, \text{disparity}(x, y))) \quad (14)$$

<Process Performed by Matching Error Minimization Control Unit (STEP7 to STEP10 of Flow Shown in FIG. 18)>

The matching error minimization control unit 216 searches for a projective transformation parameter (Pleft, Pright) for the left and right images that minimizes the matching error evaluation value (matching_error) output from the stereo matching unit 205 by varying the rotational shift correction amount θ. If a noise component is removed, the error statistically and continuously varies in accordance with the angle. Thus, the search time can be reduced by using, for example, a steepest descent method.

Note that this process corresponds to steps 7 to 10 (STEP7 to STEP10) of the flowchart shown in FIG. 18.

Figure 16:
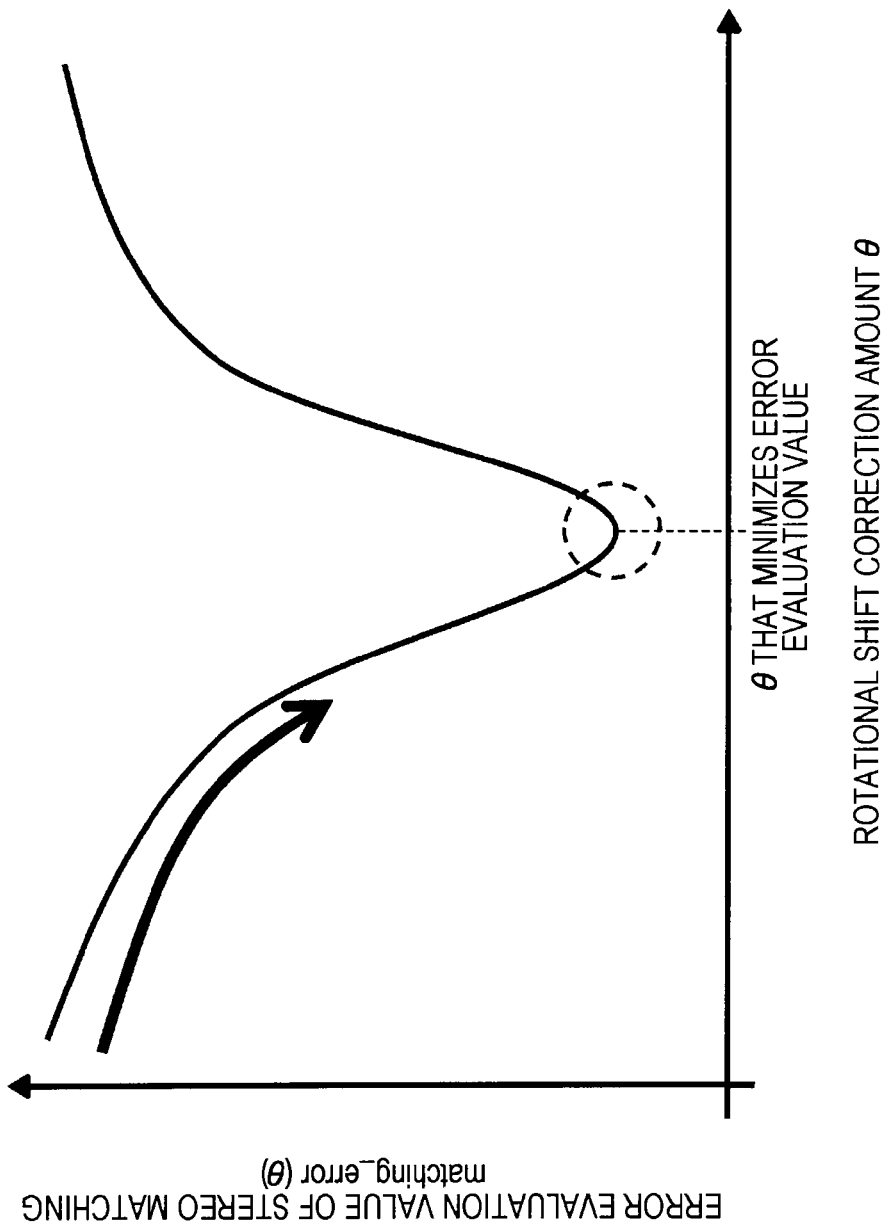
FIG. 16 illustrates a technique for computing a minimum value of a matching error evaluation value (matching_error)

As an example, a technique for simply computing the minimum value of the matching error evaluation value (matching_error) using full search is described with reference to FIG. 16. FIG. 16 is a graph having an abscissa representing the rotational shift correction amount θ and an ordinate representing the error evaluation value (matching_error) of stereo matching.

For example, a matching error evaluation value matching_error(θ) is computed for each θ by varying the rotational shift correction amount θ from −0.15 [rad] to +0.15 [rad] in increments of 0.001 [rad]. Thus, a minimum matching error evaluation value (matching_error_min) is searched for. In this way, the rotational shift correction amount θ that provides the minimum value of the matching error evaluation value (matching_error) can be obtained.

Figure 17:
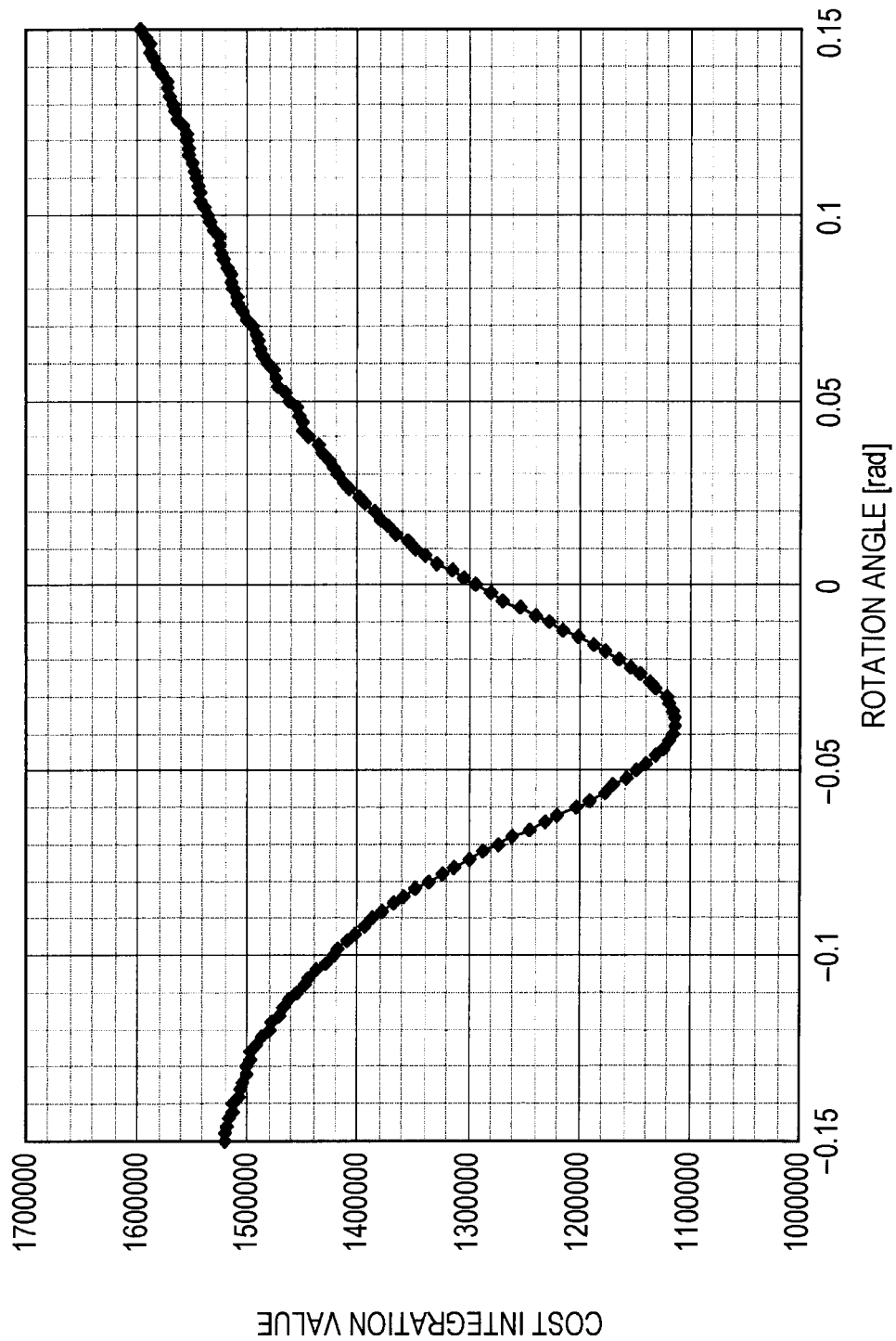
FIG. 17 illustrates an example of a process using the integration value of the minimum value of a cost function as the matching error evaluation value.

Note that for simplicity, an example of a block matching based configuration has been described. However, a cost function that is restricted so that the disparity is continuously changed in the line direction using DP (Dynamic Programming) may be defined, and the integrated value of the minimum values of the cost function may be used as the matching error evaluation value. When the cost function is used, the rotational shift correction amount θ that provides the minimum value of the cost can be obtained using a change in the cost value indicated by, for example, the curve shown in FIG. 17.

Note that as described above, the process for computing a stereo matching error is significantly complicated. However, by employing the disparity detection stereo matching process, which is an application using a stereo camera, together with the process for computing a stereo matching error, the process can be easily simplified.

<Process for Storing Projective Transformation Parameter (Result of Calibration) (STEP11 of Flow Shown in FIG. 18)>

The calibration parameter storage unit 220 stores a pair of projective transformation parameters (Pleft', Pright') for the left and right images obtained when the matching error evaluation value matching_error(θ) is equal to the minimum value (matching_error_min) as a correction parameter (the result of calibration).

Note that this process corresponds to step 11 (STEP11) of the flowchart shown in FIG. 18.

4. Sequence of Processes Executed by Image Processing Apparatus According to Present Disclosure The sequence of processes executed by the image processing apparatus according to the present embodiment of the present disclosure is described with reference to the flowchart shown in FIG. 18.

The flowchart shown in FIG. 18 represents an example of a process performed by the image processing apparatus according to the present embodiment. This process corresponds to a process in which the images of the hollow chart pattern and the textured surface illustrated in FIGS. 2 and 3 are captured at the same time (only once) and, thereafter, a calibration (projective transformation) parameter is computed.

In step 1 (STEP1), in the image capturing environment shown in FIG. 2, the stereo camera 100 receives captured left and right images of the chart pattern 101 and the textured surface 102. These input images correspond to the left camera image 151 and the right camera image 152 shown in FIG. 4.

In step 2 (STEP2), the calibration chart detection unit 210 detects the feature points (the reference points) p0, p1, p2, and p3 from the left and right stereo images acquired in STEP1.

This process corresponds to the process illustrated in FIGS. 5 and 6.

In step 3 (STEP3), the matching error minimization control unit 216 sets, as the initial value, the minimum value matching_error_min of the stereo matching error evaluation value to a possible maximum value (i.e., matching_error_min=∞). In addition, the matching error minimization control unit 216 sets the initial value of the rotational shift correction amount θ (e.g., θ=−0.15). This initial value corresponds to a start position of a predetermined measurement range of the rotational shift correction amount.

In step 4 (STEP4), the projective transformation parameter generating unit 215 generates the projective transformation parameters (Pleft, Pright) used for transforming the left and right camera images into the left and right correction images using the coordinates of the feature points (p0, p1, p2, and p3) of the chart patterns in the left and right camera images detected in STEP2 and the rotational shift correction amount θ output from the matching error minimization control unit 216.

This process corresponds to the process illustrated in FIGS. 8 to 14.

In step 5 (STEP5), the projective transformation units 200 and 201 perform projective transformation on the left and right camera images using the projective transformation parameters (Pleft, Pright) for the left and right images and generate left and right correction images.

This process corresponds to the above-described process illustrated in FIG. 14.

In step 6 (STEP6), the vertical edge detection units 202 and 203 generate edge images of the left and right correction images in the vertical direction first. Subsequently, the stereo matching unit 205 performs a stereo matching process on the obtained left and right images and computes a matching error evaluation value matching_error(θ) corresponding to the rotational shift correction amount θ.

This process corresponds to the above-described process illustrated in FIGS. 15 and 16.

In step 7 (STEP7), the matching error minimization control unit 216 determines whether the matching error evaluation value matching_error(θ) is a minimum value by comparing the matching error evaluation value matching_error(θ) with the minimum value matching_error_min of the matching error evaluation value. If the matching error evaluation value matching_error(θ) is a minimum value, the processing proceeds to step 8 (STEP8). Otherwise, the processing proceeds to step 9 (STEP9).

The process performed in steps 7 to 10 (STEP7 to STEP10) corresponds to the above-described process for computing the minimum value of the error evaluation value using the graph having an abscissa representing the rotational shift correction amount θ and an ordinate representing the error evaluation value (matching_error) of stereo matching illustrated in FIG. 16.

In step 8 (STEP8), the matching error minimum value matching_error_min is updated to the new matching error evaluation value (matching_error). In addition, the left and right projective transformation parameters (Pleft, Pright) are stored as the projective transformation parameters (Pleft', Pright') for the minimum error.

In step 9 (STEP9), the rotational shift correction amount θ is updated. In this example, the rotational shift correction amount θ is increased in increments of 0.001 [rad].

In step 10 (STEP10), it is determined whether the rotational shift correction amount θ is within the search range (in this example, whether θ<0.15). If the rotational shift correction amount θ is within the search range, the processing proceeds to step 4 (STEP4). However, if the rotational shift correction amount θ is outside the search range, the processing proceeds to step 11 (STEP11).

In step 11 (STEP11), the projective transformation parameters (Pleft', Pright') that provide a minimum error are stored in a storage unit (the calibration parameter storage unit 220) as the result of calibration.

In this way, the image processing apparatus according to the present embodiment can compute, as a parameter (a calibration parameter) that minimizes a matching error, the parameter of, for example, projective transformation performed on the captured image by using the images captured using a simplified structure as shown in FIG. 2, that is, the images obtained by capturing a texture image having a depth that differs from that of a plane chart by the left and right camera of a stereo camera at the same time.

The configuration of the image processing apparatus 180 according to the present embodiment shown in FIG. 4 is summarized as follows.

The projective transformation units 200 and 201 perform projective transformation on left and right images that are images captured from different points of view.

The calibration chart detection units 210 and 211 detect a plurality of feature points from a constituent part of a plane chart included in each of the left image and right image.

The projective transformation parameter generating unit 215 receives feature point information on the left image and the right image detected by the calibration chart detection units 210 and 211 and generates the projective transformation parameters used in the projective transformation units 200 and 201.

The stereo matching unit 205 performs stereo matching using the left projective transformation image and the right projective transformation image subjected to projective transformation performed by the projective transformation units 200 and 201.

The matching error minimization control unit 216 acquires the image rotation angle information regarding the left projective transformation image and the right projective transformation image and information corresponding to the error evaluation value of stereo matching and computes the image rotation angle that provides a minimum error evaluation value.

Furthermore, the projective transformation parameter generating unit 215 computes the final projective transformation parameter that reflects the image rotation angle that provides a minimum error evaluation value.

In the process for computing the final projective transformation parameter, a loop from step 4 (STEP4) to step 10 (STEP10) shown in FIG. 18 is performed.

That is, the matching error minimization control unit 216 sequentially updates the image rotation angle information and outputs the updated image rotation angle information to the projective transformation parameter generating unit 215. The projective transformation parameter generating unit 215 updates the projective transformation parameter on the basis of the image rotation angle information received from the matching error minimization control unit 216. In addition, the projective transformation units 200 and 201 perform projective transformation on the basis of the updated projective transformation parameter generated by the projective transformation parameter generating unit 215.

In addition, the stereo matching unit 205 performs stereo matching between the left projective transformation image and the right projective transformation image using the sequentially updated projective transformation parameter. The matching error minimization control unit 216 detects the image rotation angle at which the error evaluation value for the stereo matching between the left projective transformation image and the right projective transformation image to which the sequentially updated the projective transformation parameter is applied is minimized. Thereafter, the matching error minimization control unit 216 outputs the detected image rotation angle to the projective transformation parameter generating unit 215. The projective transformation parameter generating unit 215 generates a final projective transformation parameter on the basis of the image rotation angle at which the error evaluation value received from the matching error minimization control unit 216 is minimized.

Through such processing, the optimal projective transformation parameter that reduces the probability of the occurrence of an error in stereo matching can be computed.

In the configuration according to the present embodiment, image correction is performed using the significantly simple plane chart illustrated in FIG. 3 as a reference. A texture image having a depth that differs from that of the plane chart is captured at the same time, and the error amount of stereo matching between the left and right images is minimized. In this way, inclination of the left and right image capturing surface with respect to the baseline (i.e., the epipolar line of the left and right cameras) that is difficult to be corrected using only plane detection can be simply and accurately corrected.

Note that as a plane chart to be captured by the left and right cameras, any plane chart having setting in which only four vertexes of a rectangle located inside of the peripheral portion of the chart are acquired can be used. By capturing the image of a plane chart having a hollow portion at the center or a transparent plane chart and a textured surface at the same time, calibration can be performed through only one image capturing operation. Therefore, a low-cost adjustment process can be realized at, for example, the time of manufacture.

5. Second Sequence of Process Executed by Image Processing Apparatus According to Present Disclosure The sequence of processes illustrated in FIG. 18 shows an example of a process in which the images of a chart pattern and a textured surface are captured at the same time are used. However, such an environment in which the images including both a chart pattern and a textured surface are captured is limited. Accordingly, the sequence of a process in which the image of a chart pattern and the image of a textured surface are captured at different points of time and, thereafter, a calibration (projective transformation) parameter is computed is described below.

Figure 19B:
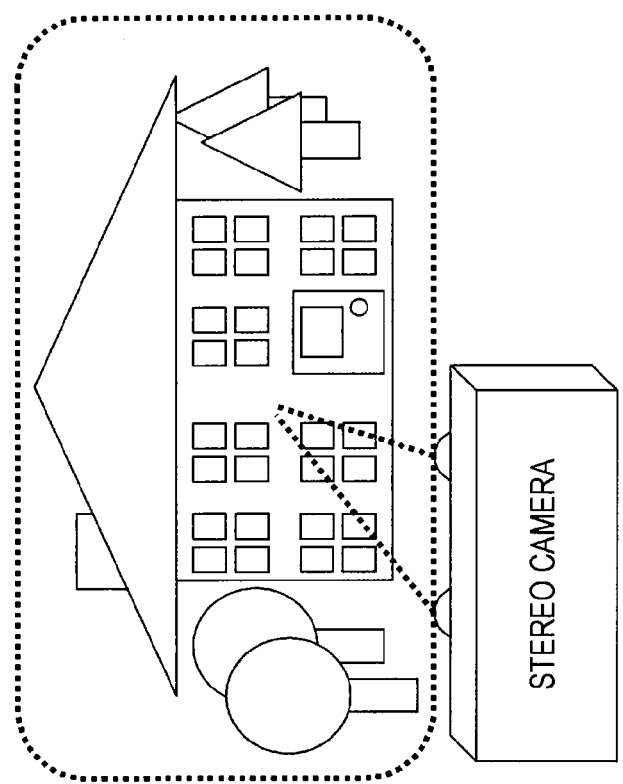
FIGS. 19A and 19B illustrate a process for computing a calibration parameter (a projective transformation parameter) by separately capturing a chart pattern and a textured surface.
Figure 19A:
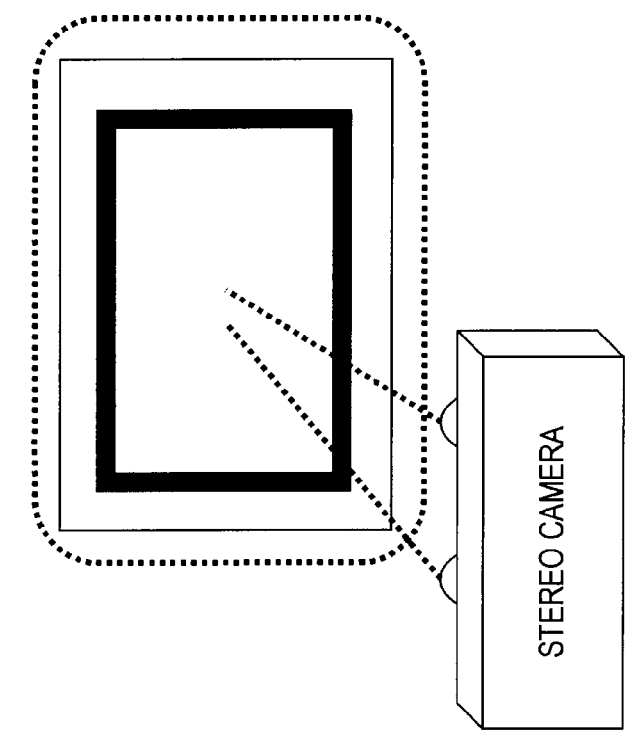

For example, as shown in FIGS. 19A and 19B, the following images are separately captured, and calibration is performed:

captured image 1 of a chart pattern (see FIG. 19A), and captured image 2 of a space having a depth that differs from that of the chart pattern (see FIG. 19B).

Figure 20:
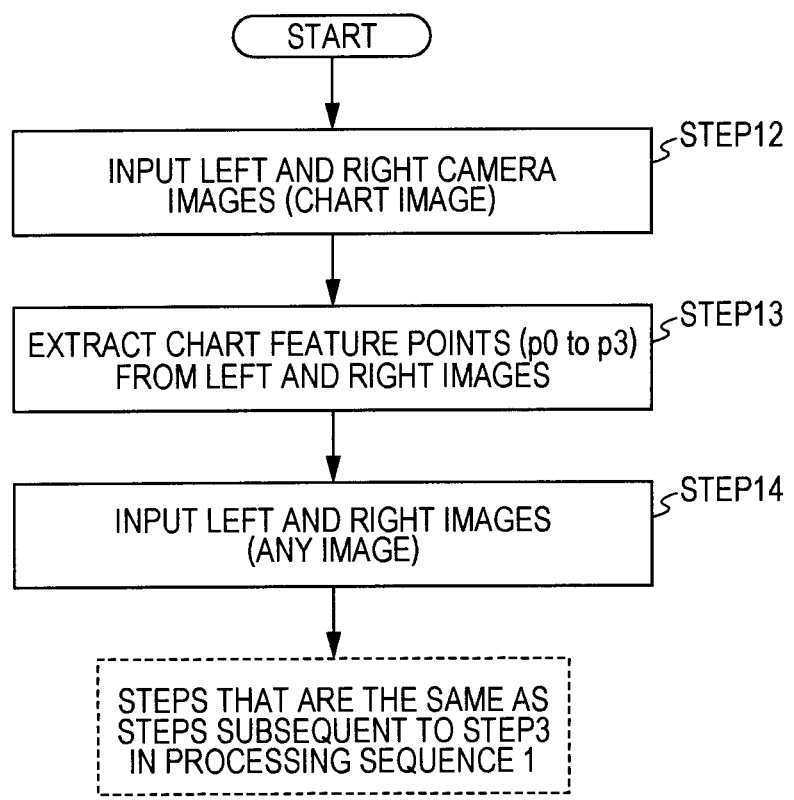
FIG. 20 is a flowchart illustrating a processing sequence performed by the image processing apparatus according to the embodiment of the present disclosure.

The sequence of these example processes is described next with reference to a flow shown in FIG. 20.

Note that the process is also performed in a configuration that is similar to that of the image processing apparatus 180 illustrated in FIG. 4.

In step 12 (STEP12), the stereo camera 100 captures a chart pattern, such as the captured image 1 shown in FIG. 19A, as left and right images. This chart pattern is similar to the chart pattern illustrated in FIGS. 2 and 3.

In step 13 (STEP13), the calibration chart detection unit 210 detects the feature points (the reference points) p0, p1, p2, and p3 from the left and right image of the chart pattern captured in step 12 (STEP12).

In step 14 (STEP14), the stereo camera 100 captures any image of a space having a depth that differs from that of the chart pattern, such as the captured image 2 shown in FIG. 19B, as left and right images.

The subsequent process is the same as the process subsequent to step 3 (STEP3) in the flow shown in FIG. 18.

That is, in step 3 (STEP3), the matching error minimization control unit 216 sets, as the initial value, the minimum value matching_error_min of the stereo matching error evaluation value to a possible maximum value (i.e., matching_error_min=∞). In addition, the matching error minimization control unit 216 sets the initial value of the rotational shift correction amount θ (e.g., θ=−0.15). This initial value corresponds to a start position of a predetermined measurement range of the rotational shift correction amount.

In step 4 (STEP4), the projective transformation parameter generating unit 215 generates the projective transformation parameters (Pleft, Pright) used for transforming the left and right camera images into the left and right correction images using the coordinates of the feature points (p0, p1, p2, and p3) of the chart patterns in the left and right camera images detected in STEP13 and the rotational shift correction amount θ output from the matching error minimization control unit 216.

In step 5 (STEP5), the projective transformation units 200 and 201 perform projective transformation on the left and right images using the projective transformation parameters (Pleft, Pright) for the left and right images and generate left and right correction images. This process corresponds to the above-described process illustrated in FIG. 14.

Note that in this example process, as shown in FIGS. 19A and 19B, the following four images are present:

a first left image and a first right image of the chart pattern captured image (see FIG. 19A), and a second left image and a second right image of any captured image, such as a landscape (see FIG. 19B).

It is desirable to use the first left image and the first right image of the chart pattern captured image in order to detect the feature points p0 to p3, and it is desirable to use the second left image and the second right image of any captured image, such as a landscape, in order to perform a matching error detection process. Note that these images are captured by the same camera.

That is, in the processes performed in step 3 (STEP3) and step 4 (STEP4), the first left image and the first right image of the chart pattern captured image are used. In contrast, in the process performed in step 5 (STEP5), projective transformation is performed on the second left image and the second right image of any captured image, such as a landscape, using a projective transformation parameter (an initial value) computed in step 4 (STEP4).

Thereafter, a loop from step 4 (STEP4) to step 10 (STEP10) can be performed using the second left image and the second right image of any captured image, such as a landscape. Finally, the minimum projective transformation parameter for a minimum matching error is computed and stored in a storage unit in step 11 (STEP11).

In this example of the process, a calibration parameter can be computed using images obtained by capturing a rectangle chart and any subject, such as a common landscape.

Note that in the example of the process, the center portion of the chart pattern shown in FIG. 19A is not necessarily hollow. Any setting in which four vertexes are detectable can be used.

6. Example of Hardware Configuration of Image Processing Apparatus

Figure 21:
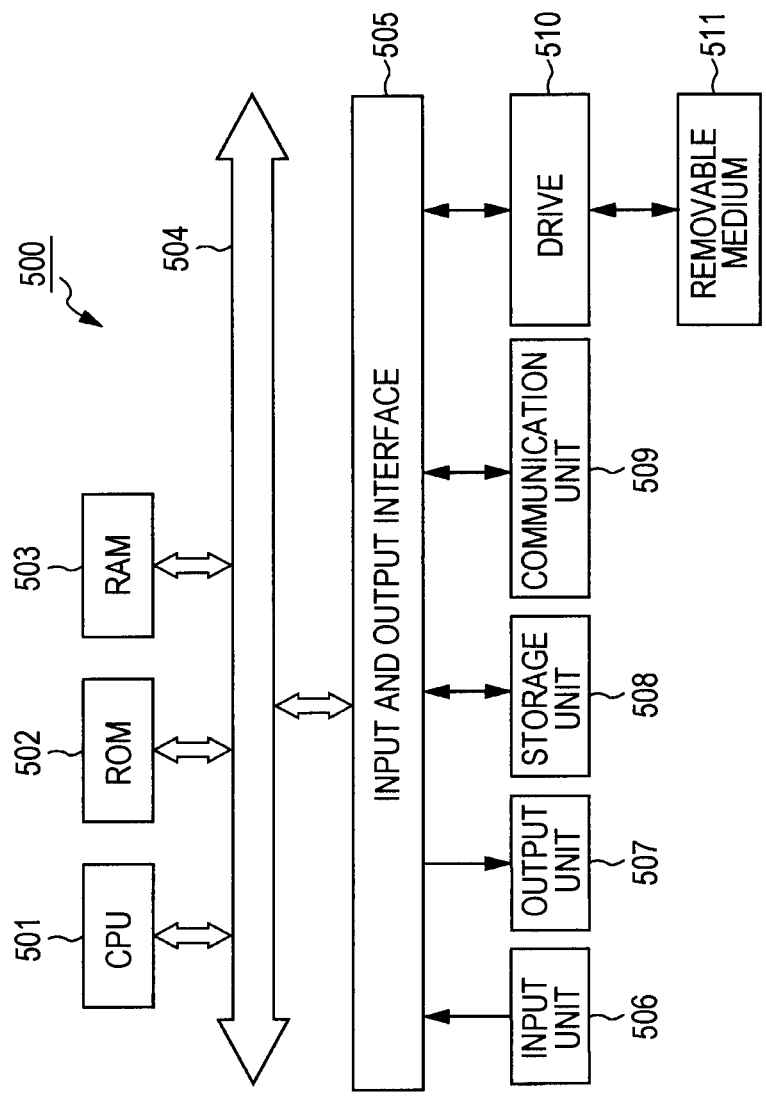
FIG. 21 illustrates an example of the hardware configuration of the image processing apparatus according to the embodiment of the present disclosure.

Finally, an example of the hardware configuration of the image processing apparatus according to the present embodiment is described. FIG. 21 illustrates a personal computer (PC) as an example of the image processing apparatus. However, the image processing apparatus according to the present embodiment can be realized by any apparatus that can receive an image, perform image processing, compute a correction parameter for, for example, projective transformation, and perform a stereo matching process. Thus, the image processing apparatus can be realized using a variety of apparatuses, such as a PC or an imaging apparatus. Note that for example, in the case of an imaging apparatus, an imaging unit is disposed upstream of the projective transformation units 200 and 201 shown in FIG. 4.

A central processing unit (CPU) 501 performs a variety of processes in accordance with a program stored in a read only memory (ROM) 502 or a storage unit 508. For example, the CPU 501 performs the image processing described in the above embodiments. A random access memory (RAM) 503 stores the program and data used by the CPU 501 as necessary. The CPU 501, the ROM 502, and the RAM 503 are connected to one another via a bus 504.

The CPU 501 is connected to an input and output interface 505 via the bus 504. The input and output interface 505 has an input unit 506 including operation switches, a keyboard, and a mouse and an output unit 507 including a display and a speaker connected thereto.

In addition, the input unit 506 receives data to be processed (e.g., a plurality of images captured by a stereo camera).

The CPU 501 performs a variety of processes in accordance with instruction information input from the input unit 506. Thereafter, the CPU 501 outputs the result of the processes to, for example, the output unit 507. The output unit 507 includes, for example, a display and a speaker.

The storage unit 508 connected to the input and output interface 505 is formed from, for example, a hard disk. The storage unit 508 stores a program executed by the CPU 501 and a variety of data items. A communication unit 509 communicates with external apparatuses via a network, such as the Internet or a local area network.

A drive 510 connected to the input and output interface 505 drives a removable medium 511, such as a magnetic disk, an optical disk, a magnetooptical disk, or a semiconductor memory and acquires a program and data stored therein. The acquired program and data are transmitted to the storage unit 508 as necessary. Thus, the acquired program and data are stored.

Although the present disclosure has been described in conjunction with specific embodiments thereof, it is evident that many alternatives, modifications and variations will be apparent to those skilled in the art within the spirit and broad scope of the disclosure. That is, the present disclosure has been described with reference to various examples, and it should not be construed that the technical scope of the disclosure is limited thereto. It should be understood that the scope of the disclosure is to be determined only from the appended claims.

Furthermore, the above-described series of processes can be executed by hardware, software, or a combination thereof. When the above-described series of processes are executed by software, the programs that defines the sequence of processes can be installed in a memory of a computer incorporated in dedicated hardware and be executed. Alternatively, the programs can be installed in a general-purpose computer that can execute a variety of processes and be executed. For example, the programs can be prerecorded in a recording medium. In addition to being installed from the recording medium, the programs can be received via a network, such as a local area network (LAN) or the Internet and be installed in a recording medium, such as a hard disk, incorporated in a computer.

It should be noted that the steps described in the present specification may be executed in not only in the above-described sequence, but also in parallel or independently in accordance with the processing power of the apparatus that executes the steps or the necessity of the processing. In addition, as used herein, the term "system" refers to a logical combination of a plurality of devices; the plurality of devices is not necessarily included in one body.

The present disclosure contains subject matter related to that disclosed in Japanese Priority Patent Application JP 2010-127112 filed in the Japan Patent Office on Jun. 2, 2010, the entire contents of which are hereby incorporated by reference.

What is claimed is:

1. An image processing apparatus comprising:
a projective transformation unit configured to perform projective transformation on a left image and a right image captured from different points of view;
a projective transformation parameter generating unit configured to generate a projective transformation parameter used by the projective transformation unit by receiving feature point information regarding the left image and the right image;
a stereo matching unit configured to perform stereo matching using a left projective transformation image and a right projective transformation image subjected to projective transformation performed by the projective transformation unit; and
a matching error minimization control unit configured to compute image rotation angle information regarding the left projective transformation image and the right projective transformation image and correspondence information of an error evaluation value of the stereo matching;
wherein the matching error minimization control unit computes an image rotation angle at which the error evaluation value is minimized, and wherein the projective transformation parameter generating unit computes the projective transformation parameter that reflects the image rotation angle at which the error evaluation value is minimized,
wherein the projective transformation parameter generating unit is configured to generate a projective transformation parameter on the basis of a plurality of feature points included in the left image and the right image,
wherein the projective transformation parameter generating unit receives feature point information detected by a calibration chart detecting unit configured to detect a plurality of feature points from a constituent part of a plane chart included in the left image and the right image and generates a projective transformation parameter, and
wherein the projective transformation parameter generating unit generates the projective transformation parameter used for generating a correction image that makes the shapes of the rectangles that form the plane chart included in a left image and a right image captured from different points of view the same.

2. The image processing apparatus according to claim 1,
wherein the matching error minimization control unit sequentially updates the image rotation angle information and outputs the image rotation angle information to the projective transformation parameter generating unit,
wherein the projective transformation parameter generating unit updates the projective transformation parameter on the basis of the image rotation angle information input from the matching error minimization control unit,
wherein the projective transformation unit performs projective transformation on the basis of the updated projective transformation parameter generated by the projective transformation parameter generating unit,
wherein the stereo matching unit performs stereo matching between the left projective transformation image and the right projective transformation image using the sequentially updated projective transformation parameter,
wherein the matching error minimization control unit detects the image rotation angle that minimizes the error evaluation value of the stereo matching between the left projective transformation image and the right projective transformation image to which the sequentially updated projective transformation parameter is applied and outputs the detected image rotation angle to the projective transformation parameter generating unit, wherein the projective transformation parameter generating unit generates a final projective transformation parameter on the basis of the image rotation angle that minimizes the error evaluation value input from the matching error minimization control unit.

3. The image processing apparatus according to claim 1, wherein the plane chart is formed from a hollow rectangle, and wherein the calibration chart detecting unit detects four vertexes of the rectangle that forms the plane chart as the feature points.

4. The image processing apparatus according to claim 3, wherein the stereo matching unit performs stereo matching using a texture image captured inside a hollow portion of the plane chart formed from a hollow rectangle.

5. The image processing apparatus according to claim 1, wherein processing is performed by receiving a left image and a right image obtained by capturing a plane chart formed from a hollow rectangle and a textured surface located inside of the hollow portion at a distance different from the plane chart.

6. The image processing apparatus according to claim 1, wherein a first left image and a first right image obtained by capturing a plane chart formed from a rectangle and a second left image and a second right image obtained by capturing a subject that does not include the plane chart are input, and wherein detection of a feature point is performed on the first left image and the first right image, and wherein stereo matching is performed between the second left image and the second right image.

7. An image processing method for use in an image processing apparatus, comprising:

performing projective transformation on a left image and a right image captured from different points of view using a projective transformation unit;

generating a projective transformation parameter used by the projective transformation unit by receiving feature point information regarding the left image and the right image using a projective transformation parameter generating unit;

performing stereo matching using a left projective transformation image and a right projective transformation image subjected to projective transformation performed by the projective transformation unit and using a stereo matching unit; and computing image rotation angle information regarding the left projective transformation image and the right projective transformation image and correspondence information of an error evaluation value of the stereo matching using a matching error minimization control unit;

wherein the image rotation angle at which the error evaluation value is minimized is computed in computing image rotation angle information regarding the left projective transformation image and the right projective transformation image and correspondence information of an error evaluation value of the stereo matching, and wherein the projective transformation parameter that reflects the image rotation angle at which the error evaluation value is minimized is computed in generating a projective transformation parameter, wherein the projective transformation parameter generating unit is configured to generate a projective transformation parameter on the basis of a plurality of feature points included in the left image and the right image, wherein the projective transformation parameter generating unit receives feature point information detected by a calibration chart detecting unit configured to detect a plurality of feature points from a constituent part of a plane chart included in the left image and the right image and generates a projective transformation parameter, and wherein the projective transformation parameter generating unit generates the projective transformation parameter used for generating a correction image that makes the shapes of the rectangles that form the plane chart included in a left image and a right image captured from different points of view the same.

8. A non-transitory computer readable storage medium for causing an image processing apparatus to perform image processing, comprising:

an instruction to perform projective transformation on a left image and a right image captured from different points of view using a projective transformation unit;

an instruction to generate a projective transformation parameter used by the projective transformation unit by receiving feature point information regarding the left image and the right image using a projective transformation parameter generating unit;

an instruction to perform stereo matching using a left projective transformation image and a right projective transformation image subjected to projective transformation performed by the projective transformation unit and using a stereo matching unit; and an instruction to compute image rotation angle information regarding the left projective transformation image and the right projective transformation image and correspondence information of an error evaluation value of the stereo matching using a matching error minimization control unit;

wherein the instruction to compute image rotation angle information regarding the left projective transformation image and the right projective transformation image and correspondence information of an error evaluation value of the stereo matching includes an instruction to compute the image rotation angle at which the error evaluation value is minimized, and wherein the instruction to generate a projective transformation parameter includes an instruction to compute the projective transformation parameter that reflects the image rotation angle at which the error evaluation value is minimized, wherein the projective transformation parameter generating unit is configured to generate a projective transformation parameter on the basis of a plurality of feature points included in the left image and the right image, wherein the projective transformation parameter generating unit receives feature point information detected by a calibration chart detecting unit configured to detect a plurality of feature points from a constituent part of a plane chart included in the left image and the right image and generates a projective transformation parameter, and wherein the projective transformation parameter generating unit generates the projective transformation parameter used for generating a correction image that makes the shapes of the rectangles that form the plane chart included in a left image and a right image captured from different points of view the same.

* * * * *